(12) United States Patent
Hamada et al.

(10) Patent No.: US 7,031,781 B1
(45) Date of Patent: Apr. 18, 2006

(54) RECORDING APPARATUS, RECORDING METHOD AND RECORDING MEDIUM

(75) Inventors: Ichiro Hamada, Kanagawa (JP); Hiraku Inoue, Kanagawa (JP); Tetsuya Aoki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/573,661

(22) Filed: May 18, 2000

(30) Foreign Application Priority Data

May 19, 1999 (JP) ................................. 11-138853

(51) Int. Cl.
*G06F 17/00* (2006.01)

(52) U.S. Cl. ..................................... 700/94

(58) Field of Classification Search ............. 707/104.1; 369/30.09; 360/48, 69; 700/94; 725/151, 725/153, 31; 386/46, 48, 124, 69, 109; 84/605, 84/610
See application file for complete search history.

(56) References Cited

U.S. PATENT DOCUMENTS

| | | | | |
|---|---|---|---|---|
| 5,923,811 A | * | 7/1999 | Kawamura et al. | ............ 386/65 |
| 6,271,455 B1 | * | 8/2001 | Ishigaki et al. | ................ 84/605 |
| 6,467,093 B1 | * | 10/2002 | Inoue et al. | ................ 725/151 |
| 6,487,720 B1 | * | 11/2002 | Ohishi | ........................ 725/31 |
| 6,650,659 B1 | * | 11/2003 | Hamada et al. | ............. 370/487 |

* cited by examiner

*Primary Examiner*—Huyen Le
*Assistant Examiner*—Lun-See Lao
(74) *Attorney, Agent, or Firm*—Frommer Lawrence Haug LLP; William S. Frommer

(57) ABSTRACT

This invention relates to a recording apparatus for recording digital data compressively encoded by use of a predetermined scheme having: receiving means for receiving a transport stream from an external unit connected through a digital bus; extracting means for extracting from the received transport stream a transport stream packet having a predetermined packet identification (PID); acquiring means for acquiring the compressively encoded digital data arranged in the transport stream packet extracted by the extracting means; and recording means for recording the acquired digital data onto a predetermined recording medium.

20 Claims, 20 Drawing Sheets

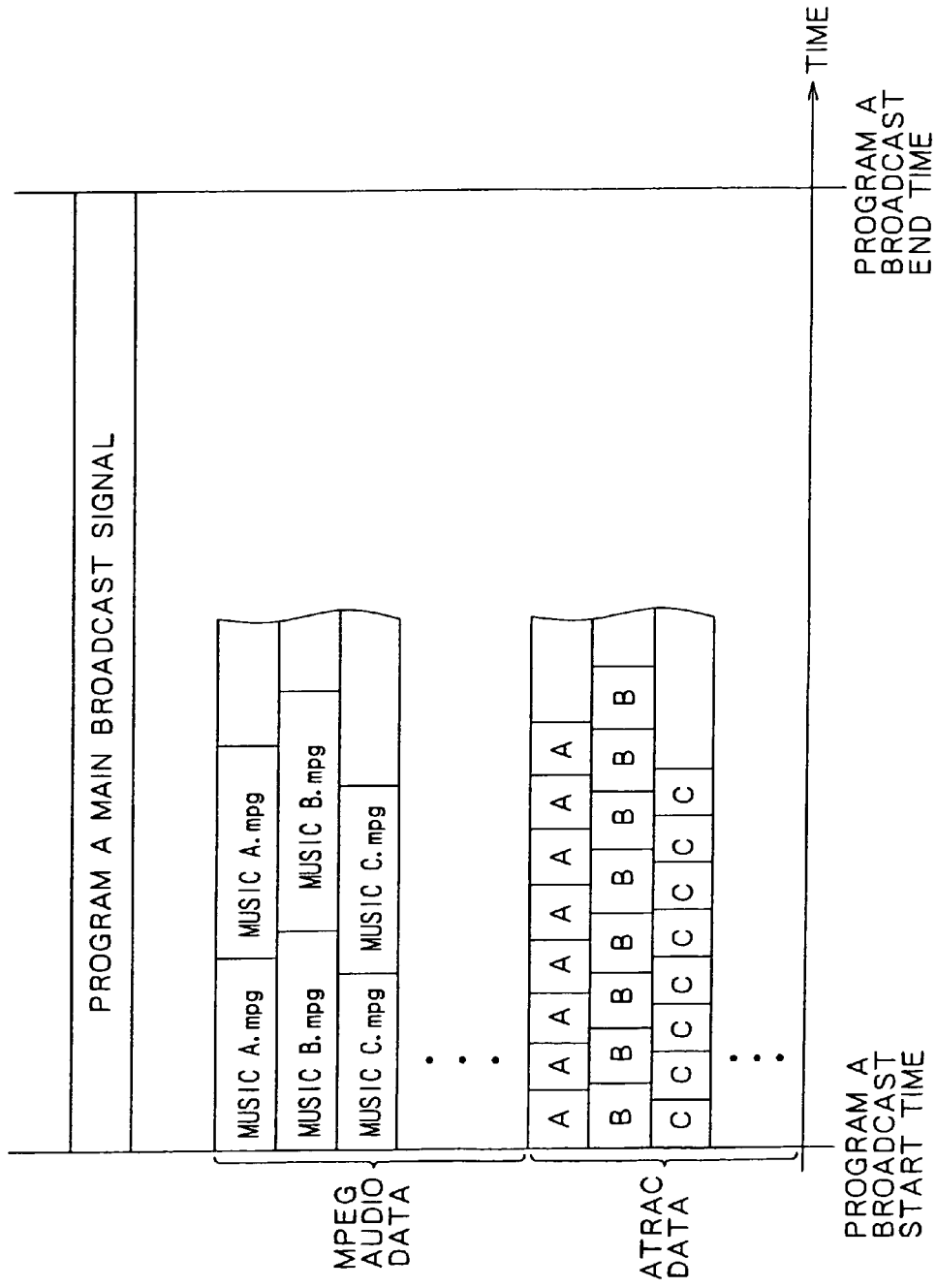

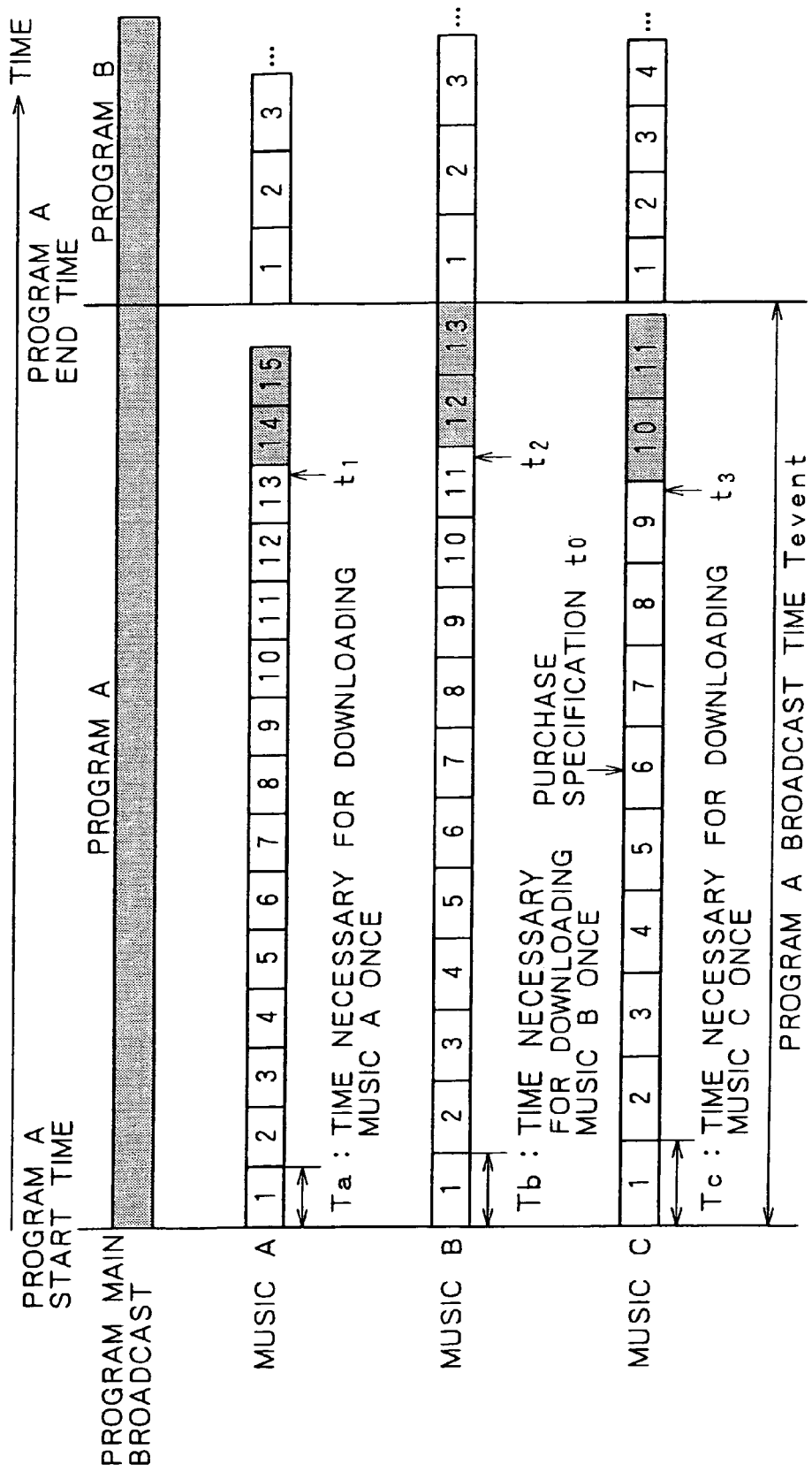

FIG. 8

| | FDF field length ('1000') | | audio_data_type_1 ('0000') | | | |
|---|---|---|---|---|---|---|
| | audio_data_type_2 ('0000') | copy right | original or copy | stereo mono | emphasis |
| data_start indicator | data_end indicator | PES_data_counter | copyright mode | EMI_mode | Reserved ('1') |

21
22
23
24  present_PES_number
25
26
27  Reserved (0×FFFF)
28
29  ATRAC_data_checksum
30

ATRAC Data body
(159 bytes)

188

ATRAC data syntax (168bytes)

FIG. 9

| | CS[0] | CS[1] | CS[2] | CS[3] | CS[4] | CS[5] | CS[6] | CS[7] |
|---|---|---|---|---|---|---|---|---|
| 29 | | | | | | | | |
| 30 | AT[0][0] | AT[0][1] | | | | | | AT[0][7] |
| | AT[1][0] | | | | | | | |
| | AT[2][0] | | | | | | | |
| ⋮ | | | | | | | | |
| 188 | AT[158][0] | | | | | | | AT[158][7] |

RECORDING APPARATUS, RECORDING METHOD AND RECORDING MEDIUM

BACKGROUND OF THE INVENTION

The present invention relates generally to a recording apparatus, a recording method, and a recording medium and, more particularly, to a recording apparatus, a recording method, and a recording medium that are suitable for use in recording compressed and encoded audio data provided by downloading services.

Recently, digital satellite broadcasting such as SKY PerfecTV (a trademark) for example is becoming widespread. Compared with conventional analog broadcasting, digital satellite broadcasting can transmit signals of higher quality and provide multichannel service. The digital satellite service like this provides many channels dedicated to sports, movies, music, news and so on. Among these dedicated channels, the music channel is one of most popular channels.

Viewing (including listening to) such a music channel may make viewers want to buy CDs for example of the music they listened on the channel. It is convenient for viewers if they can download the music while viewing it on the music channel. To realize this, the applicant hereof proposed a system, as Japanese Patent Application No. Hei 10-201731 for example, in which music data encoded by use of ATRAC (Adaptive Transform Acoustic Coding) are multiplexed on the main broadcast signals (video signal and audio signal) of the music channel for distribution and viewers who bought (or downloaded) the ATRAC data are billed.

It should be noted that ATRAC is a coding scheme for use in recording audio data onto MD (Mini Disc) (trademark) recording media.

Meanwhile, no specific proposal has been made for an MD recording apparatus for constituting the above-mentioned system, namely an apparatus for recording ATRAC-based audio data onto an MD without decoding.

SUMMARY OF THE INVENTION

It is therefore an object of the present invention to provide a recording apparatus, a recording method, and a recording medium that are capable of recording ATRAC-based audio data without decoding the same.

In carrying out the invention and according to one aspect thereof, there is provided a recording apparatus for recording digital data compressively encoded by use of a predetermined scheme comprising: receiving means for receiving a transport stream from an external unit connected through a digital bus; extracting means for extracting from the received transport stream a transport stream packet having a predetermined packet identification (PID); acquiring means for acquiring the compressively encoded digital data arranged in the transport stream packet extracted by the extracting means; and recording means for recording the acquired digital data onto a predetermined recording medium.

In carrying out the invention and according to another aspect thereof, there is provided the recording apparatus further comprising a reproducing means for reproducing the audio data recorded on the predetermined recording medium and compressively encoded by use of the predetermined scheme.

In carrying out the invention and according to still another aspect thereof, there is provided a recording method for a recording apparatus for recording digital data compressively encoded by use of a predetermined scheme, comprising the steps of: receiving a transport stream from an external unit connected through a digital bus; extracting from the received transport stream a transport stream packet having a predetermined packet identification (PID); acquiring the compressively encoded digital data arranged in the transport stream packet extracted by the extracting means; and recording the acquired digital data onto a predetermined recording medium.

In carrying out the invention and according to yet another aspect thereof, there is provided a recording medium storing a computer program for use in a recording method for a recording apparatus for recording digital data compressively encoded by use of a predetermined scheme, the computer program comprising the steps of: receiving a transport stream from an external unit connected through a digital bus; extracting from the received transport stream a transport stream packet having a predetermined packet identification (PID); acquiring the compressively encoded digital data arranged in the transport stream packet extracted by the extracting means; and recording the acquired digital data onto a predetermined recording medium.

According to the above-mentioned recording apparatus, recording method, and recording medium, an inputted partial transport stream is converted into a transport stream and a transport stream packet having a predetermined PID is extracted from the this transport stream. Extracted predetermined information arranged in the transport stream packet is detected. On the basis of the detected predetermined information, the transport stream packet is checked. According to the result of this checking, the extraction of the transport stream packet is controlled. Further, the compressively encoded audio data arranged in the extracted transport stream packet are acquired to be recorded on the predetermined recording medium.

BRIEF DESCRIPTION OF THE DRAWINGS

These and other objects of the invention will be seen by reference to the description, taken in connection with the accompanying drawing, in which:

FIG. 3 illustrates types of music data to be downloaded;

FIG. 4 illustrates a limit time of purchasing music data to be downloaded;

FIG. 8 is a further diagram illustrating a TS packet in which ATRAC data are arranged;

FIG. 9 illustrates ATRAC data checksum of a TS packet;

DETAILED DESCRIPTION OF PREFERRED EMBODIMENTS

This invention will be described in further detail by way of example with reference to the accompanying drawings.

Figure 1:
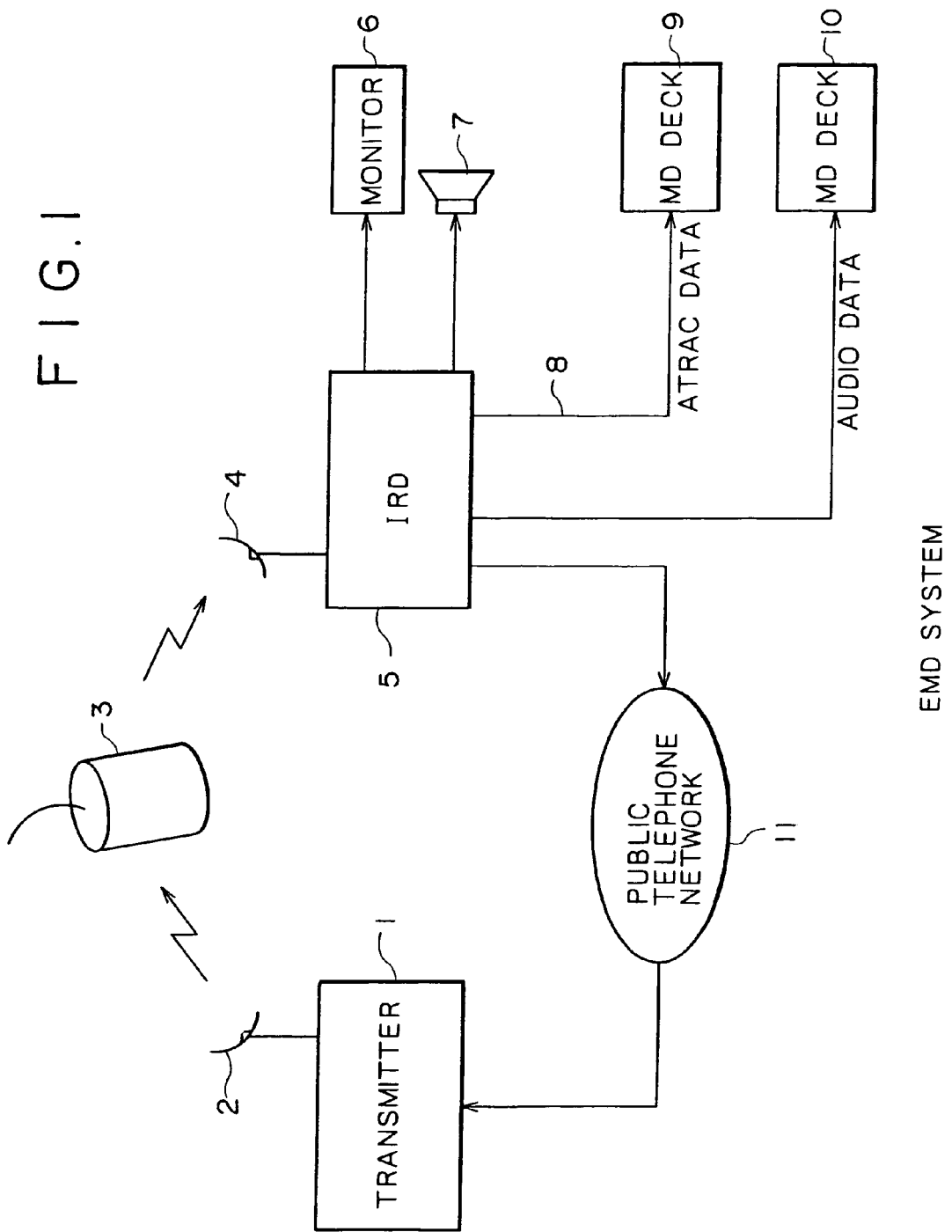
FIG. 1 is a block diagram illustrating an exemplary configuration of an EMD system to which the present invention is applied.

Now, referring to FIG. 1, there is shown an exemplary configuration of an EMD (Electronic Music Distribution) system practiced as one preferred embodiment of the present invention. In the EMD system, a transmitter 1 on the broadcasting station side multiplexes mainly a broadcast signal (composed of video signal and audio signals compressed by MPEG-2 (Moving Picture Experts Group 2)) with music data for downloading (MPEG audio data and ATRAC data) associate with a music program for example, scrambles the multiplexed data, executes necessary processing such as error correction on the scrambled data, modulates a resultant MPEG transport stream (hereafter referred to as a TS) by QPSK (Quadrature Phase Shift Keying), and sends the modulated data from an antenna 2 as a radio wave.

The radio wave transmitted from the antenna 2 is relayed by a communications satellite 3. The relayed radio wave is received by an antenna 4 to be supplied to IRD (Integrated Receiver/Descrambler) 5. The IRD 5 QPSK-demodulates the ratio wave received by the antenna 4, executes necessary processing such as error correction, and extracts a TS packet of a user-selected channel for descrambling. In addition, the IRD 5 MPEG-decodes the main broadcast signals arranged in the extracted TS packet to output the obtained video signal to a monitor 6 and the audio signal to a speaker 7.

The IRD 5 also extracts a TS packet in which download music data (ATRAC data) are arranged and supplies the extracted TS packet to an MD deck (or recorder) 9 through an IEEE 1394 bus 8. Further, the IRD 5 MPEG-decodes the music data for downloading (MPEG audio data) and outputs the decoded music data to the speaker 7 or an MD deck 10 connected to a audio output terminal.

Then, the IRD 5 records music data download history onto a built-in IC card 40 (refer to FIG. 10) and sends the downloaded history information to the transmitter 1 through a public telephone network 11 at regular intervals. It should be noted that the download history information sent to the transmitter 1 is used as accounting information for a user of the IRD 5.

The MD deck 9 records the music data (ATRAC data) supplied from the IRD 5 through the IEEE 1394 bus 8 onto an MD or reproduces the music data from it. The MD deck 10 encodes the music data (audio data obtained by decoding MPEG audio data) supplied from the IRD 5 and records the encoded music data onto an MD or reproduces the music data from it.

Figure 2:
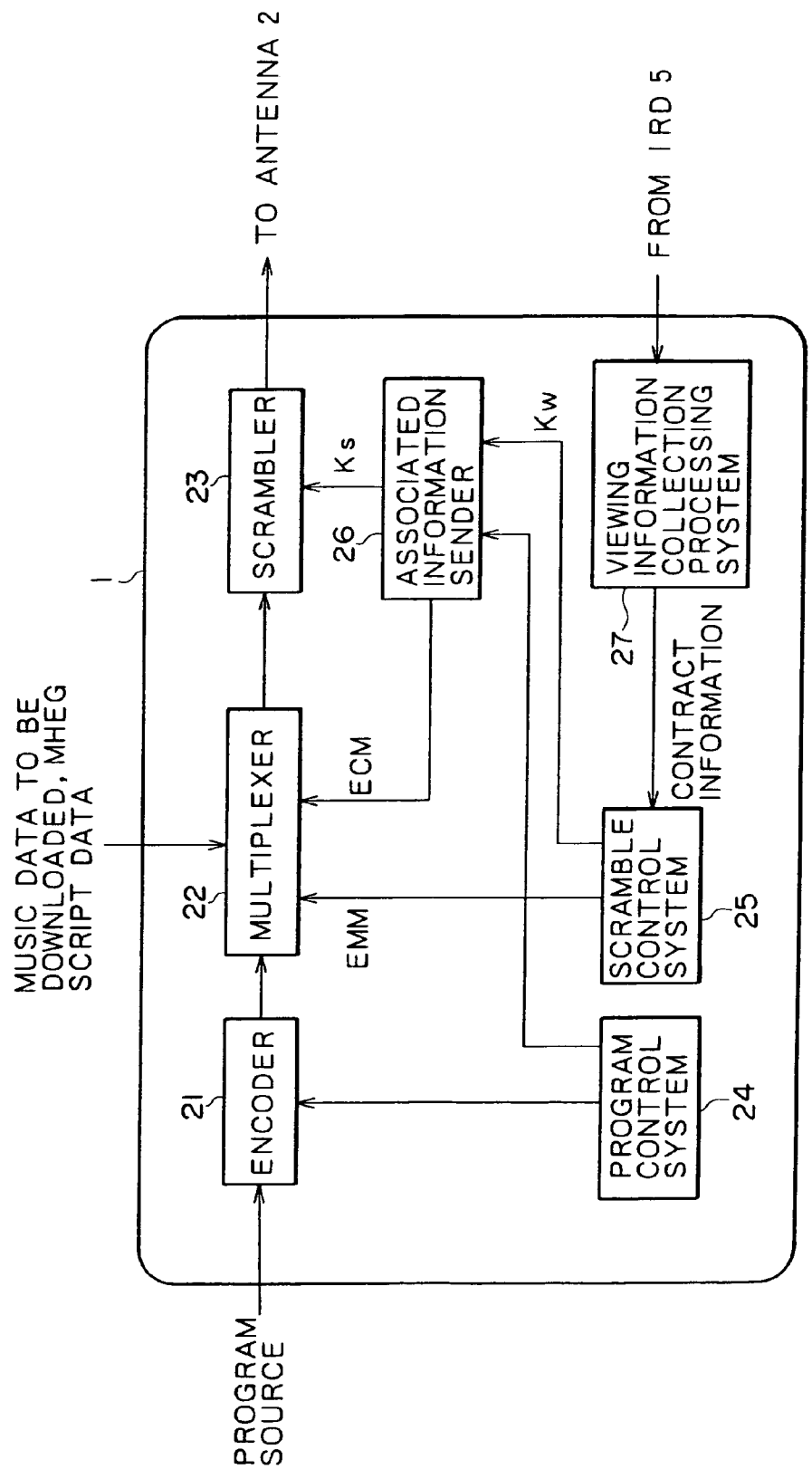
FIG. 2 is a block diagram illustrating an exemplary configuration of a transmitter shown in FIG. 1.

FIG. 2 illustrates a detailed exemplary configuration of the transmitter 1. An encoder 21 of the transmitter 1 compresses by MPEG-2 a program source (video and audio signals as a main broadcast signal) and outputs the compressed program source to a multiplexer 22. The multiplexer 22 multiplexes, in a time division manner, the main broadcast signal supplied from the encoder 21, individual information EMM (Entitlement Management Message) supplied from a scramble control system 25, program information ECM (Entitlement Control Message) supplied from an associated-information sender 26, music data for downloading (ATRAC data and MPEG audio data), audio additional information for the music data, an MHEG (Multimedia and Hypermedia Information Coding Experts Group) script for realizing interactive GUI (Graphical User Interface) for selecting music to be downloaded at the receiving side, and an additional information table PSI (Program Specific Information) indicative in which TS packet of TS the main broadcast signal and the music for downloading are included, thereby generating a TS of MPEG-2. The generated TS is supplied to a scrambler 23.

It should be noted that, because the music data for downloading include ATRAC data (to be described later) which are poor in integrity with a TS of MPEG-2, some contrivance (to be described in detail later) is required for multiplexing.

The additional information table PSI includes a PAT (Program Association Table), a PMT (Program Map Table), and a SIT (Selection Information Table). Sequential reference of these tables indicates the packet ID of a TS packet that includes desired data. Details thereof are described in ETS 300468, Digital Video Broadcasting (DVB), Specification for Service Information (SI) in DVB System, for example.

The following describes music data for downloading with reference to FIG. 3. As shown, music data for downloading multiplexed with the main broadcast signal of program A for example are data of music A, music B, and music C associated with the program A. For each piece of music, there are two types of data; MPEG audio data compressed by MPEG-2 and ATRAC data compressed by ATRAC. The MPEG audio data and the ATRAC data are repetitively transmitted during the broadcasting of program A.

A time it takes for transmitting the MPEG audio data once is equal to a time it takes for the MPEG audio data to be reproduced (a playing time). A time it takes for the ATRAC data to be transmitted once is ¼ of a time it takes for the ATRAC data to be reproduced.

For example, assume that the broadcast time of program A be 1 hour and the play time of music A be 8 minutes. Then, it also takes 8 minutes for transmitting the MPEG audio data (music A.mpg) of music A once. During the broadcasting of program A, the MPEG audio data of music A are transmitted a maximum of 7 (=60/8) times repetitively. On the other hand, the time it takes for one transmission of the ATRAC data of music A is 2 (=8/4) minutes. Therefore, during the broadcasting of program A, the ATRAC data of music A are transmitted a maximum of 30 (=60/2) times repetitively. If the playing time of music B is 9 minutes, the MPEG audio data (B.mpg) of music B are transmitted a maximum of 6 (=60/9) times repetitively during the broadcasting of program A. On the other hand, a time it takes for one transmission of the ATRAC data of music B is 2.25 (=9/4) minutes. Therefore, during the broadcasting of program A, the ATRAC data of music B are transmitted a maximum of 26 (=60/2.25) times repetitively.

Referring to FIG. 2 again, the scrambler 23 scrambles the TS supplied from the multiplexer 22 by use of a scramble key (Ks) supplied from the associated-information sender 26 and outputs the scrambled TS to the subsequent stage. A program control system 24 generates a predetermined control signal to control the encoder 21. The program control system 24 also outputs information such as the program ID and channel ID of a program corresponding to the main broadcast signal compressed and encoded by the encoder 21 to the associated-information sender 26. The scramble control system 25 supplies a contract key (Kw) to the associated-information sender 26 and, at the same time, generates the individual information EMM including the contract key encrypted by use of a key unique to the IRD 5 and outputs the generated EMM to the multiplexer 22.

It should be noted that the individual information EMM includes card ID, contract key number (Kw_no), contract key (Kw), contract channel IDs (service_id) and series_id), contract number ID (event_id), contract type (authorize_type), program purchase upper limit (Over_view), SMS polling date (polling_date), and SMS uplink fee (uplink_fee) of which details will be described later.

The associated information sender 26 supplies the scramble key to the scrambler 23. The associated-information sender 26 also generates program information ECM including the scramble key encrypted by use of the contract key supplied from the scramble control system 25 and outputs the generated program information ECM to the multiplexer 22.

It should be noted that the program information ECM includes contract key number (Kw_no), encrypted scramble keys (Ks_Odd and Ks_Even), channel IDs (service_id, series_id, and event_id), number ID (event_id), pay-per-view fee (PPV fee), preview time, preview limit count, current time, and purchase limit time, of which details will be described later.

A viewing information collection processing system 27 processes viewing history information for example supplied from the IRD 5 through the public telephone network 11 and outputs the processed information to the scramble control system 25 as contract information.

The following describes the preview time and preview limit count included in the program information ECM. Each piece of music data can be previewed in a range specified by the preview time and preview limit count included in the program information ECM. Provided, however, that the preview time set for music data is shorter than the entire playing time of the corresponding piece of music and long enough for allowing the listener to sufficiently preview the music. The preview limit count is set to two or more so as to allow the listener to repetitively compare plural pieces of music data. It should be noted that each of the preview time and the preview limit count can be set to different values for different pieces of music.

The following describes the purchase limit time included in the program information ECM with reference to FIG. 4. As described, the music data for downloading (MPEG audio data and ATRAC data) of each piece of music are repetitively transmitted during broadcasting program. In the example shown in FIG. 4, during broadcasting of program A, the music data for downloading of music A are transmitted 15 times repetitively, the music data for downloading of music B 13 times repetitively, and the music data for downloading of music C 11 times repetitively.

For example, if the listener specifies the purchase of music C to the IRD 5 at timing to which is during the sixth transmission of music C, the music data to be transmitted at the seventh transmission is downloaded in usual. However, if, for some reason, the downloading of the music data to be transmitted at the seventh transmission fails, downloading is reexecuted on the music data to be downloaded at the eighth transmission. Therefore, the last transmission of music data is for reexecution and the timing at which the listener can specify the downloading of the music data to be transmitted at the time just before the last is set as a purchase limit time by use of an elapsed time from the program start time. To be specific, the purchase limit times for music A, music B, and music C are set to timing $t_1$, timing $t_2$, and timing $t_3$ respectively as shown in FIG. 4. Thus, setting purchase limit times prevents the situation from happening in which the music specified for purchase cannot be downloaded.

The following describes processing for multiplexing ATRAC data with a TS of MPEG-2. TS packets in which the TS of MPEG-2 is transmitted have each a fixed length of 188 bytes. On the other hand, sound groups in which ATRAC data are transmitted are each 424 bytes long. Therefore, in terms of integrity, it is not good for ATRAC data to be directly made a TS of MPEG-2.

Figure 5A:
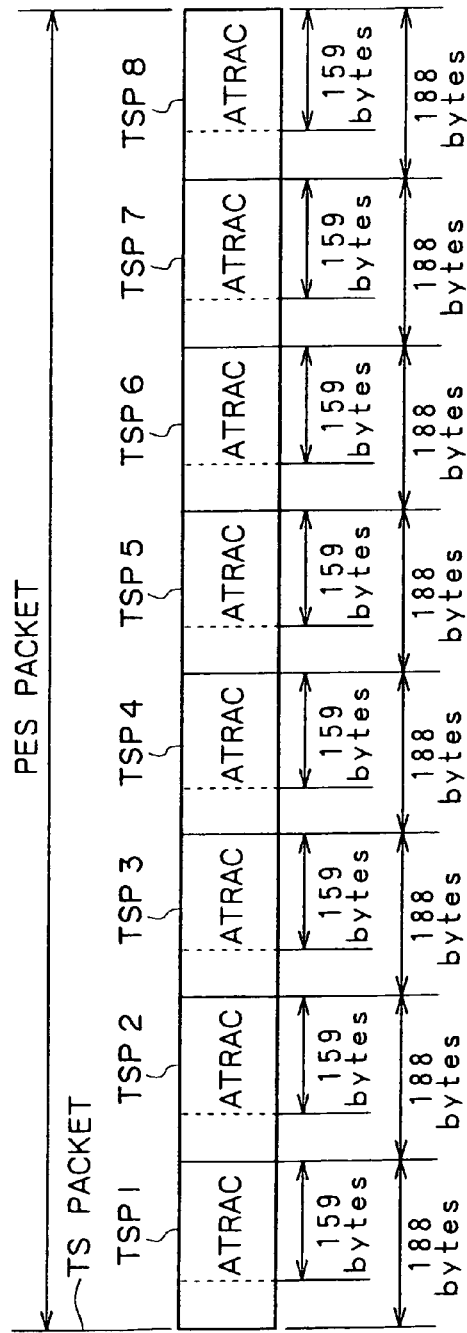
FIGS. 5A and 5B illustrate a TS packet in which ATRAC data are arranged.
Figure 5B:
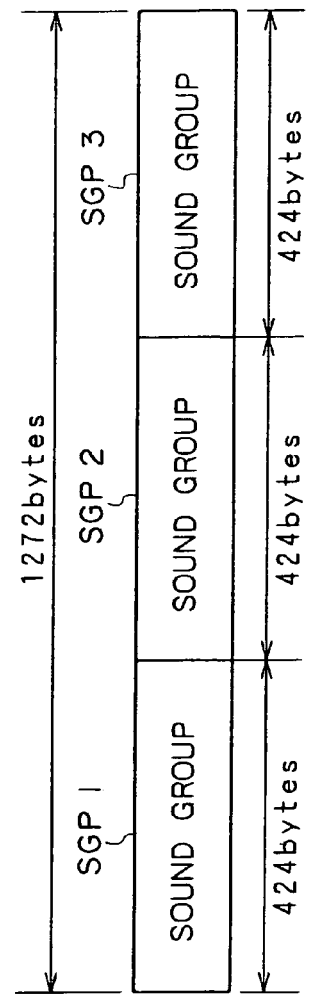

Therefore, in the present embodiment, ATRAC data of 159 bytes are arranged in 1 TS packet and 1 PES (Packetized Elementary Stream) is constituted by 8 TS packets TSP1 through TSP8 as shown in FIG. 5A. Consequently, one PES packet contains ATRAC data of 1,272 (=159×8) bytes. Meanwhile, the 1,272-byte ATRAC data are equivalent to 3 sound groups each of which constituting a transmission unit of ATRAC data as shown in FIG. 5B, so that 1 PES packet can transmit 3 sound groups. Thus, transmission of the integral number of sound groups by 1 PES packet improves the integrity between ATRAC data and TS of MPEG-2.

Figure 6:
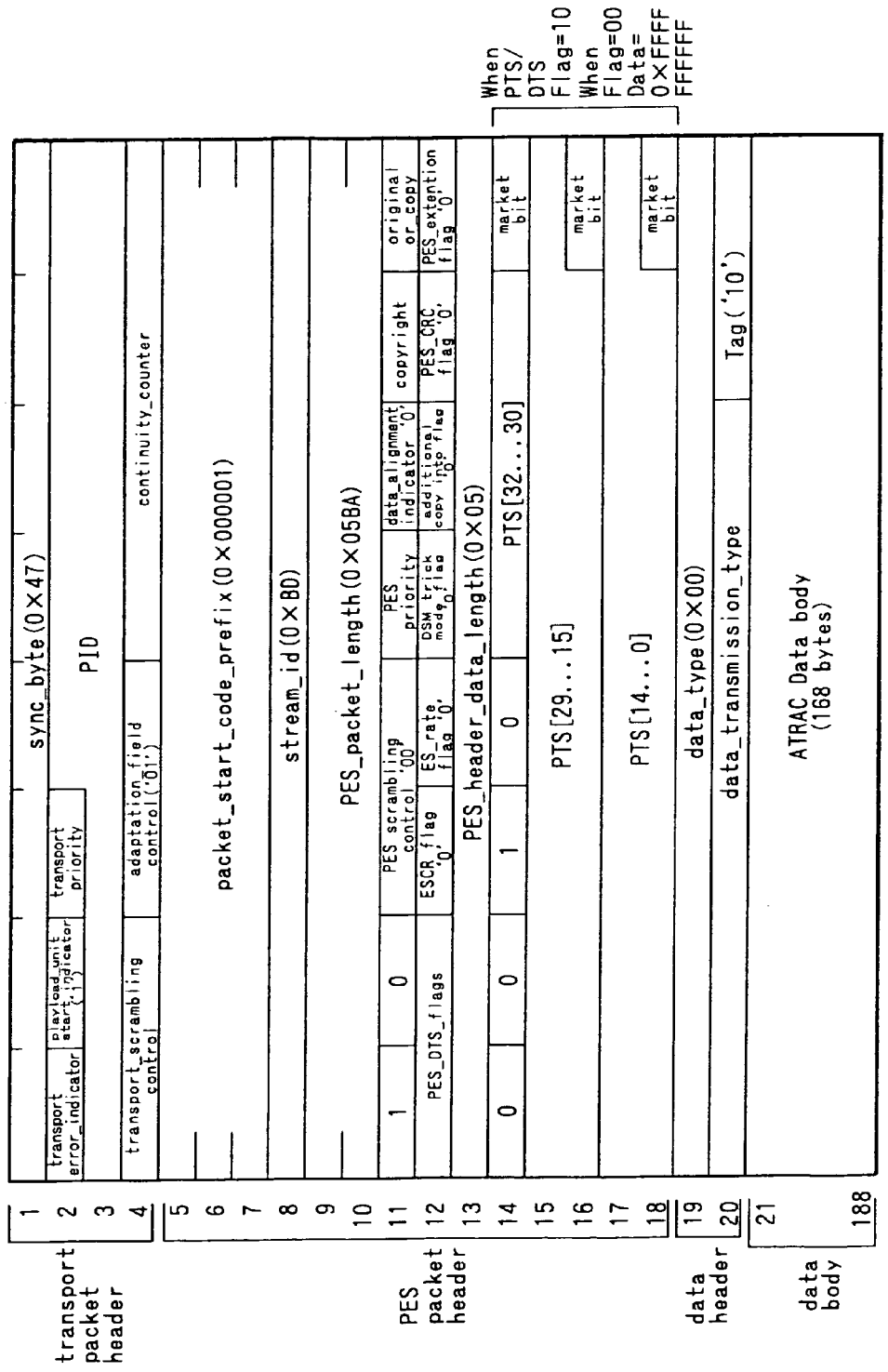
FIG. 6 is a diagram illustrating a TS packet in which ATRAC data are arranged.

Referring to FIG. 6, there is shown a TS in which ATRAC data are arranged. As shown, 4 bytes from the beginning of the 188-byte TS packet provide a TS packet header, the following 14 bytes provide a PES packet header, the following 2 bytes provide a data header, and the remaining 168 bytes provide a data body.

The TS packet header contains, from beginning to end, 1-byte synchronization byte, TS error indicator for showing a flag indicative of the presence or absence of an error in this TS packet, payload unit start indicator for describing a flag indicative that a new PES packet starts from the payload of this TS packet, and TS priority indicative of the importance of the TS packet. Next come 13-bit stream identification (PID) indicative of the attribute of individual stream of this TS packet, TS scrambling control indicative of presence or absence or type of scramble of the payload of the packet, adaptation field control indicative of presence or absence of adaptation field, and continuity counter indicative of a serial number assigned to packets having same PID.

The TS packet header contains, from beginning to end, a packet start code prefix consisting of fixed 3 bytes, 1-byte stream ID for stream identification, and a 2-byte PES packet length. Next come 2-bit fixed pattern "10", 2-bit PES scramble control, 1-bit PES priority, 1-bit data alignment indicator, 1-bit copyright, 1-bit original/copy identification, 2-bit PTS and DTS flag, 1-bit ESCR flag, 1-bit ES rate flag, 1-bit DMS trick mode flag, 1-bit additional copy information flag, 1-bit PES CRC flag, and 1-bit PES extension flag.

Further, the TS packet header contains a 1-byte PES header data length, a 4-bit fixed pattern "11011", a 3-bit time stamp (PTS32 through PTS30), a 1-bit market bit, a 15-bit time stamp (PTS29 through PTS15), a 1-bit market bit, a 15-bit time stamp (PTS14 through PTS0), and a 1-bit market bit.

The data header contains, from beginning to end, 1-byte data type, 6-bit data transmission type, and 2-bit tag.

Figure 7:
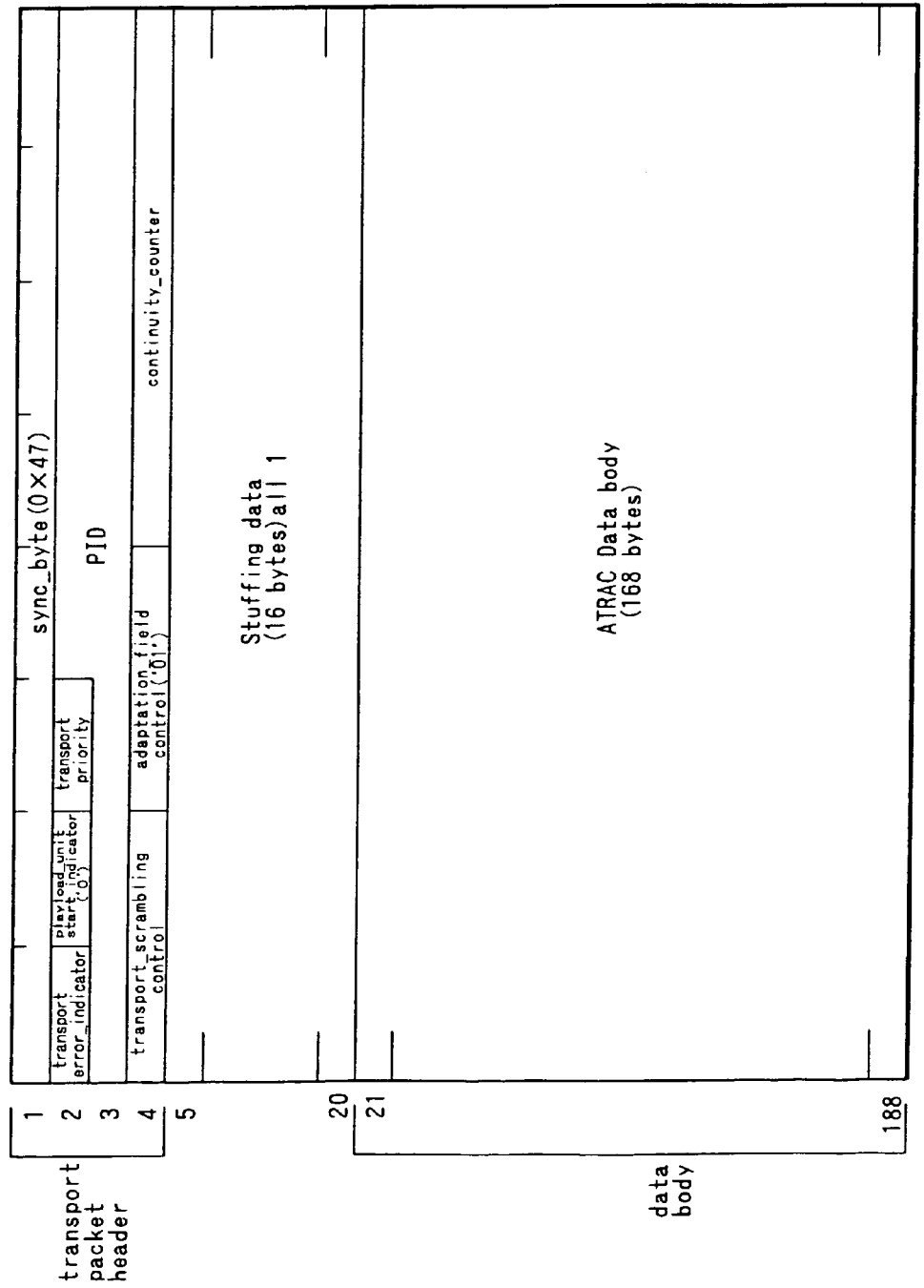
FIG. 7 is another diagram illustrating a TS packet in which ATRAC data are arranged.

It should be noted that the TS packet shown in FIG. 6 is the first of the 8 TS packets constituting the PES packet, the second through eighth packets containing stuffing data as shown in FIG. 7 instead of the PES packet header and data header contained in the first TS packet (refer to FIG. 6).

The data body in which ATRAC data are arranged contains, from beginning (byte 21 of the TS packet) to end, 4-bit FDF (Field Dependent Field) field length indicative of the length of FDF, 4-bit audio type 1, and 4-bit audio type 2. The audio type 1 defines an audio type (for example, ATRAC). The audio type 2 defines a category in data type 1 (for example, ATRAC1 or ATRAC2). Next come flags corresponding to the copyright and the original/copy (CGMS (Copy Generation Management System), stereo/monaural identification, emphasis information, data start indicator, data stop indicator, and 3-bit PES data counter.

The data start indicator is a flag for this TS packet to indicate the start of the music data. The data start indicator of the TS packet at the start of the music data is set to "1". The data stop indicator is a flag for this TS packet to indicate the TS packet at the end of the music data. This data stop indicator is set to "1". The PES data counter indicates which of the 8 PES-packet-constituting TS packets this TS packet is.

Further, the data body contains 1-bit copyright mode identification, 1-bit EMI (Encryption Mode Information) mode identification, 1-bit reserve bit, 3-byte present PES number, 2-byte reserve, and 1-byte ATRAC data checksum, followed by ATRAC data.

The present PES number indicates which of the music-constituting PES packet this TS packet is. Therefore, detection of the present PES numbers of sequentially transmitted TS packets and the PES data counter value can determine the continuity of the TS in units of TS packets.

The ATRAC data checksum is arranged on byte 29 of the TS packet. The following describes the relationship between the ATRAC data checksum and the ATRAC data body of byte 30 and on with reference to FIG. 9. As shown, let the bits of the ATRAC data checksum be CS[0] through CS[7] and the bits of the ATRAC data body from byte 30 through byte 188 be AT[0] [0] through AT[158] [7], then the values of CS[0] through CS[7] are set so that CS[0]^AT[0] [0]^AT [2] [0]^ . . . ^AT[158] [0]=OCS[1]^AT[0] [1]^AT[1][1]^AT[2] [1]^ . . . ^AT [158] [1]=0 CS[7]^AT[0] [7]^AT[1] [7]^AT[2] [7] . . . ^AT[158] [7]=0. Symbol "^" indicates exclusive OR operation.

Thus, the arrangement of the checksum for the ATRAC data body allows the side that received this TS packet to check the ATRAC data body for errors.

Figure 10:
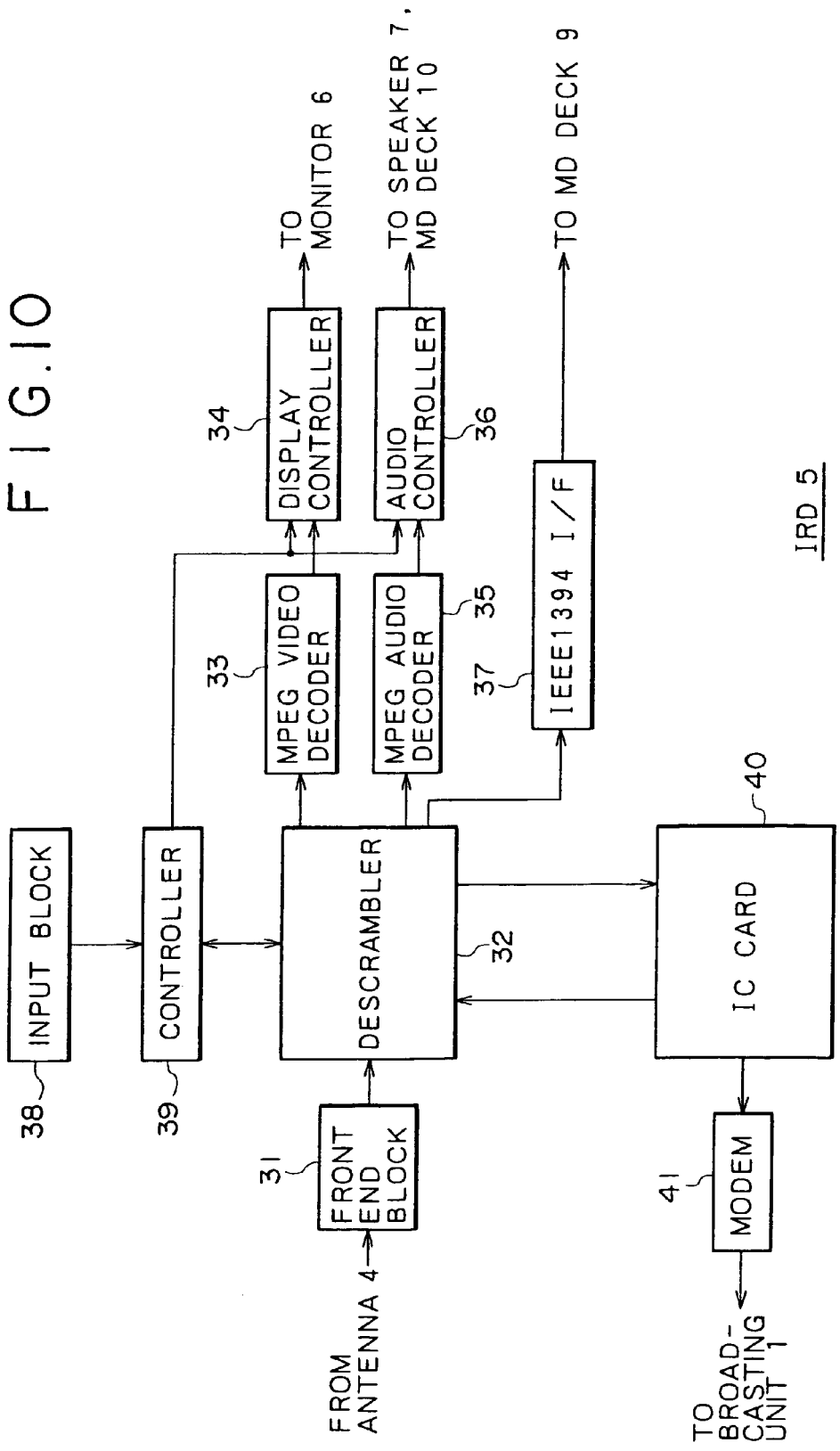
FIG. 10 is a block diagram illustrating an exemplary configuration of an IRD shown in FIG. 1.

Referring to FIG. 10, there is shown an exemplary configuration of the IRD 5. An front end block 31 of the IRD 5 selects a signal corresponding to user's tune-in operation from the broadcast signals received by the antenna 4, executes processing such as QPSK demodulation and error correction on the selected signal, and outputs a resultant TS (scrambled) to a descrambler 32.

The descrambler 32 descrambles the TS inputted from the front end block 31 by use of an individual key supplied from an IC card 40 to separates the TS into TS packets which contain the main broadcast signal (MPEG video data and MPEG audio data), MPEG audio data for downloading, ATRAC data for downloading, and MHEG script for GUI. In addition, the descrambler 32 supplies the TS packet of the MPEG video data of the main broadcast signal to an MPEG video decoder 33, the TS packet of the MPEG audio data of the main broadcast signal and the TS packet of the MPEG audio data for downloading to an MPEG audio decoder, the TS packet of the ATRAC data for downloading to an IEEE 1394 interface (I/F) 37, and the TS packet of the MHEG script for GUI to a controller 39.

The MPEG video decoder 33 decodes the MPEG video data supplied from the descrambler 32 and outputs the resultant video data to a display controller 34. The display controller 34 makes the monitor 6 display the video data supplied from the MPEG video decoder 33 onto a main program display area 51 (refer to FIG. 12) of a GUI screen inputted from the controller 39 for example.

The MPEG audio decoder 35 decodes the MPEG audio data of the main broadcast signal or the MPEG audio data for downloading supplied from the descrambler 32 and outputs the resultant audio data to an audio controller 36. The audio controller 36, under the control by the controller 39, executes processing such as fade-in/out on the audio data inputted from the MPEG audio decoder 35 and outputs the processed audio data to the speaker 7 or the MD deck 10.

The IEEE 1394 interface 37 deletes a PMT corresponding to a program other than the program in which music purchase can be made from the PAT of the additional information table PSI multiplexed with the TS packet in which the ATRAC data inputted from the descrambler 32 are arranged, deletes the PID corresponding to each of main broadcast signal, MPEG audio data for downloading, and audio additional information from the PMT corresponding to that program, adds a SIT indicative of a partial TS, and outputs this partial TS to the MD deck 9 through the IEEE 1394 bus 8.

According to the user's tune-in operation or the user's operation made for the GUI screen (refer to FIG. 12), an input block 38 outputs the information of the user's operation to the controller 39. On the basis of the operational information supplied from the input block 38 or predetermined information supplied from the descrambler 32, the controller 39 controls each component of the IRD 5. For example, the controller 39 processes the MHEG script for GUI inputted from the descrambler 32 and outputs the image data to the display controller 34.

The IC card 40 stores information such as the individual key for descrambling TS packets. In response to a request from the descrambler 32, the IC card 40 supplies the information to the descrambler 32. The IC card 40 also stores history information about listening of pay-per-view programs and downloaded music data. A modem 41 outputs the history information stored in the IC card 40 to the transmitter 1 through the public telephone network 11 at predetermined time intervals.

Figure 11:
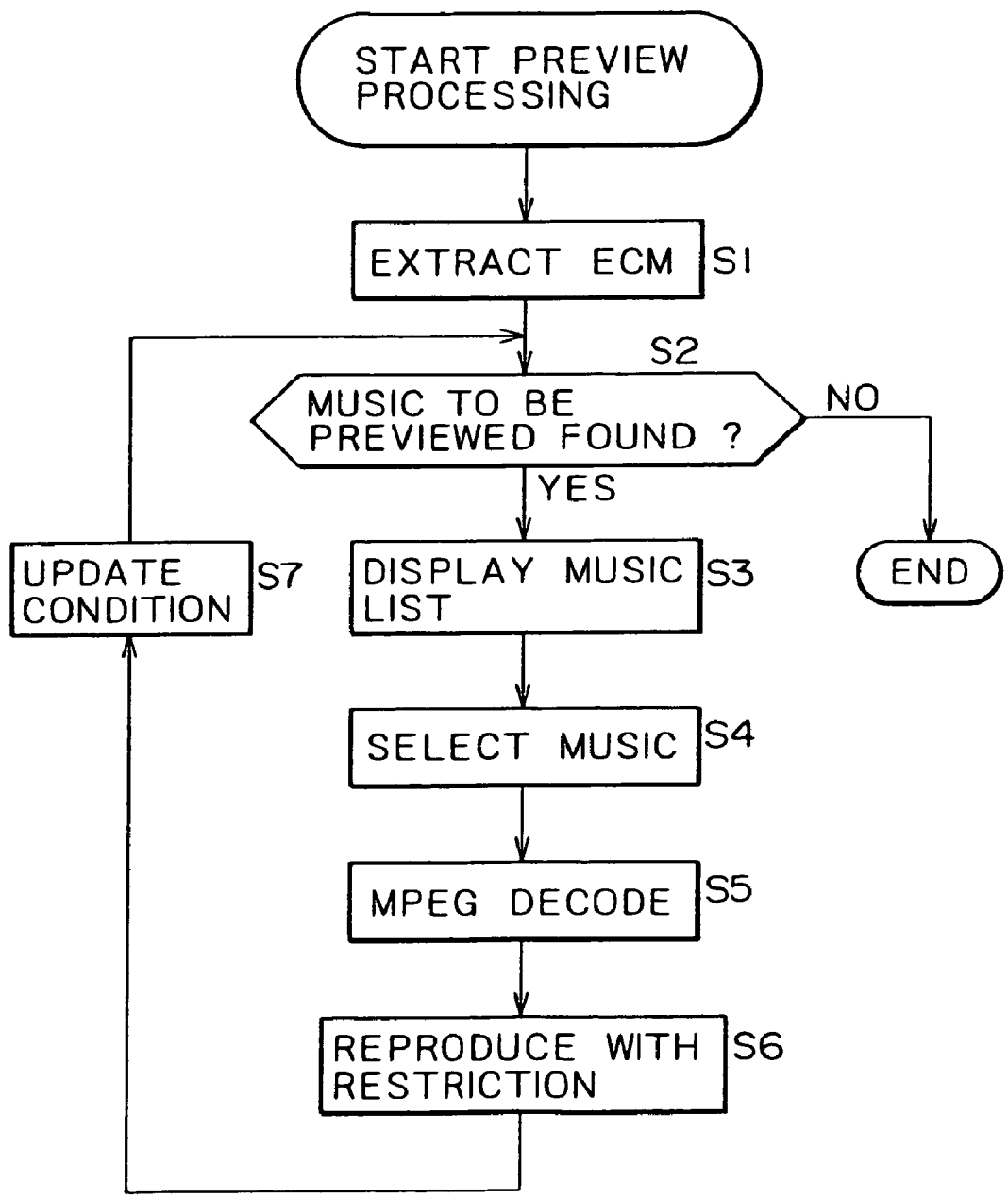
FIG. 11 is a flowchart for describing preview processing of the IRD.

The following describes the preview processing of the IRD 5 with reference to the flowchart shown in FIG. 11. This preview processing is executed after executing an operation for displaying the GUI for music purchase during listening of a broadcast program by the user (namely the listener) of the IRD 5 in which music data can be purchased (namely downloaded) and, according to this operation, the GUI as shown in FIG. 12 is displayed on the monitor 6.

In step S1, the descrambler 32 extracts program information ECM multiplexed on the TS and outputs the preview time, preview limit count, and purchase limit time of the music data described in the extracted ECM and outputs these pieces of described information to the controller 39. In step S2, the controller 39 compares the preview count made so far with the preview limit count for each piece of music to check for previewable music. If previewable music is found, the processing goes to step S3.

Figure 12:
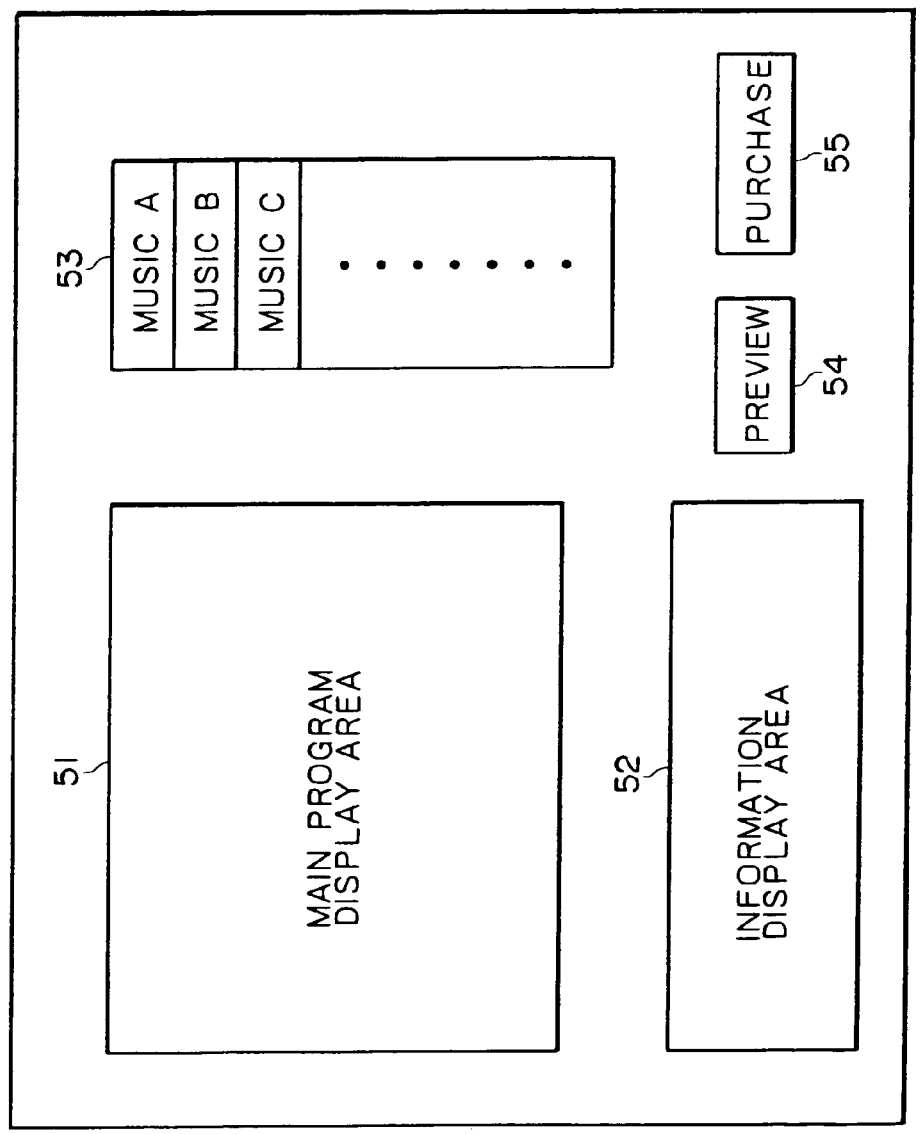
FIG. 12 illustrates an exemplary display of GUI.

In step S3, the controller 39 displays a music list 53 on the GUI screen as shown in FIG. 12. It should be noted that, for the music titles included in a music list 53, there is a distinction in the way of display between those titles which can be previewed and purchased and others which cannot be previewed (the preview limit count has been reached) but can be purchased. For example, a title of the music which can be previewed and purchased is displayed in thick characters while a title of the music which cannot be previewed but can be purchased is displayed in thin characters.

When the user selects one of the titles that can be previewed in the music list 53 and presses a preview button 54, then, in step S4, the select information of the selected title of the music to be previewed is supplied from the input block to the controller 39.

In step S5, the descrambler 32, under the control by the controller 39, outputs the MPEG audio data of the music selected in step S4 to the MPEG audio data decoder 35. The MPEG audio data decoder 35, under the control by the controller 39, decodes the MPEG audio data supplied from the descrambler 32 for a length of the preview time described in the program information ECM and outputs the resultant audio data to the audio controller 36. In step S6, the audio controller 36 executes a fade-in operation on the volume of the audio data at the start portion thereof inputted from the MPEG audio decoder 35 and a fade-out operation at the end portion of the audio data and outputs the resultant audio data to the speaker 7.

Instead of executing fade-in and fade-out operations, an audio message indicative of preview may be inserted in the audio data at the start and end thereof. Alternatively, the tone quality of the audio data may be varied by means of a filter for example in a range in which the purpose of preview can be attained.

In step 7, the controller 39 increments the preview count of the music selected in step S4 by one.

Then, back in step S2, the processing operations in step S2 and on are repeated until there is no previewable music. When no previewable music is found, the preview processing ends.

Thus, the preview of music data is not only advantageous for listeners but also effective in promoting the purchase of music data. Limiting the number of times music data can be previewed and executing fade-in and fade-out operations on the audio data to be reproduced can prevent the music data from being duplicated by joining previewed pieces of audio data.

Figure 13:
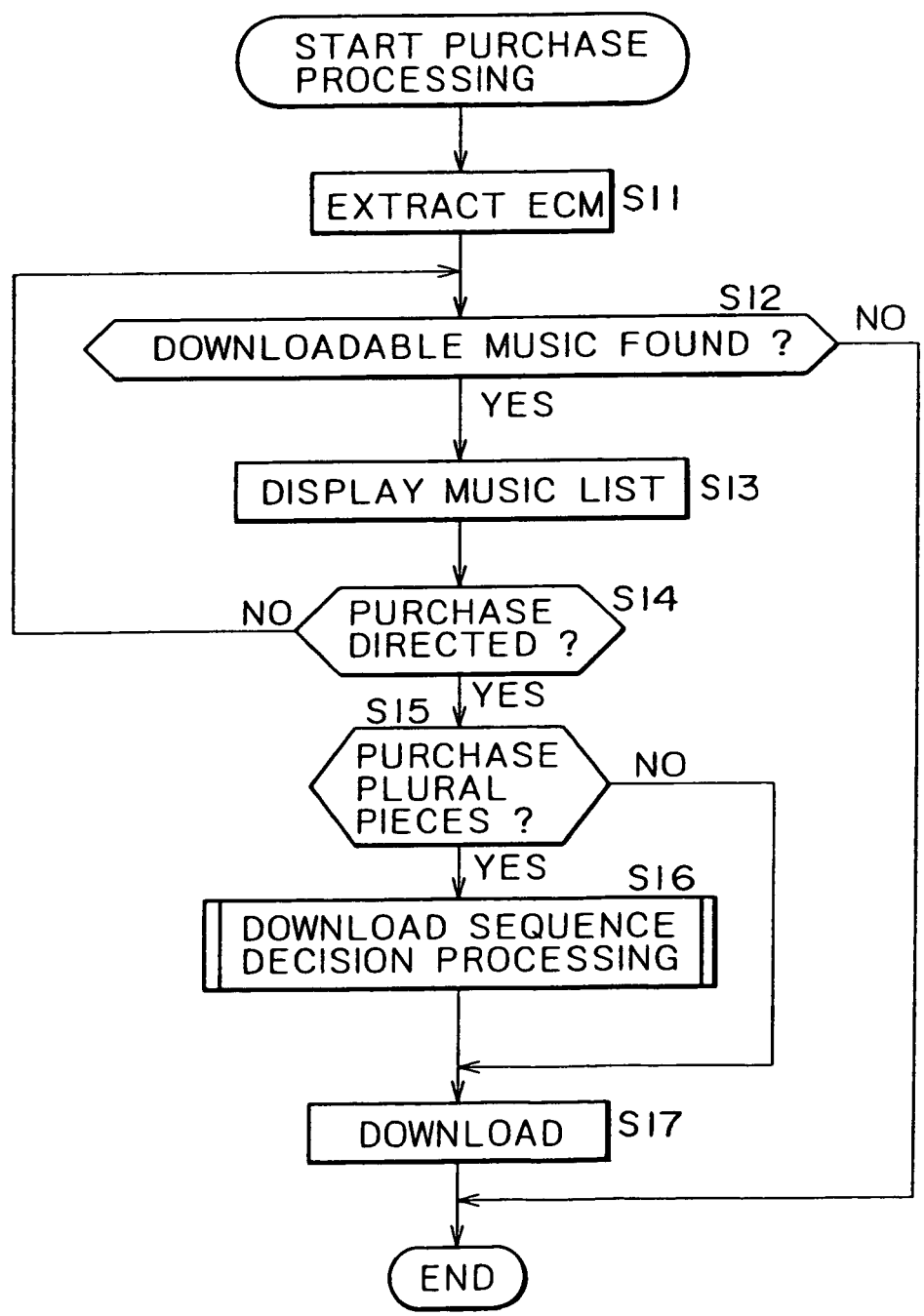
FIG. 13 is a flowchart for describing purchase processing of IRD.

The following describes purchase processing of the IRD 5 with reference to the flowchart shown in FIG. 13. This purchase processing is executed after the user executes an operation for making the IRD 5 display the GUI for music purchase during preview of a program in which music data can be purchased and the GUI as shown in FIG. 12 is accordingly displayed on the monitor 6. It should be noted that the music data to be purchased are MPEG audio data for downloading or ATRAC data. The selection between them may be made by the user by executing a predetermined operation or by the IRD 5 by detecting its audio output terminal or a recording unit (the MD deck 9 for example) connected to the IEEE 1394 interface 37.

In step S11, program information ECM is extracted from the TS by the descrambler 32 and the preview time, preview limit count, and purchase limit time for the music data described in the extracted program information ECM are outputted to the controller 39. In step S12, the controller 39 compares the present time with the purchase limit time for each piece of music to check for purchasable music. If purchasable music is found, the processing goes to step S13.

In step S13, the controller 39 displays the music list 53 on the GUI screen as shown in FIG. 12. It should be noted that, for the music titles included in a music list 53, there is a distinction in the way of display between those titles which can be previewed and purchased and others which cannot be previewed (the preview limit count has been reached) but can be purchased. For example, a title of the music which can be previewed and purchased is displayed in thick letters while a title of the music which cannot be previewed but can be purchased is displayed in thin letters.

In step S14, the controller 39 determines whether the user viewing this music list 53 has selected any of music titles listed on the music list 53 and pressed a purchase button 55. Until the purchase button 55 is found pressed, the processing goes back to step S12 to repeat the processing operation of step S12 and on. It should be noted that the display of the music titles that exceeded the purchase limit time is changed during this repetition. When the purchase button 55 is found pressed, the processing goes to step S15.

Figure 14:
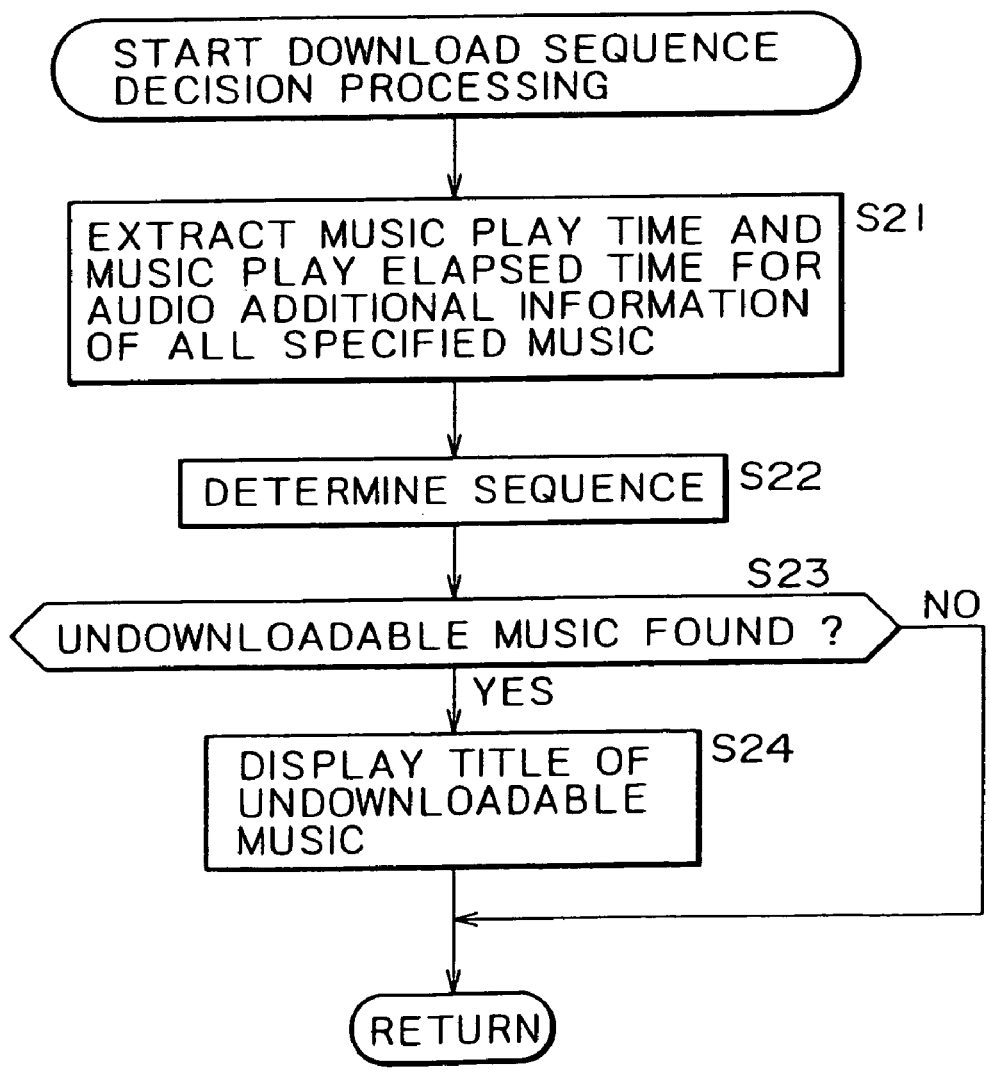
FIG. 14 is a flowchart for describing download sequence decision processing of the IRD.

In step S15, the controller 39 determines whether the purchase of plural pieces of music has been specified by the user in step S14. If the purchase of plural pieces of music is found specified, the processing goes to step S16. In step S16, the controller 39 determines the sequence of downloading the plural pieces of music to be purchased. The following describes this download sequence determination processing with reference to the flowchart shown in FIG. 14.

In step S21, the descrambler 32, under the control by the controller 39, extracts from the TS the audio additional information at the current point of time (music play time, play elapsed time, transmission time of MPEG audio data for downloading and transmission elapsed time) corresponding to the plural pieces of music specified for purchase and outputs the extracted information to the controller 39.

Figure 15:
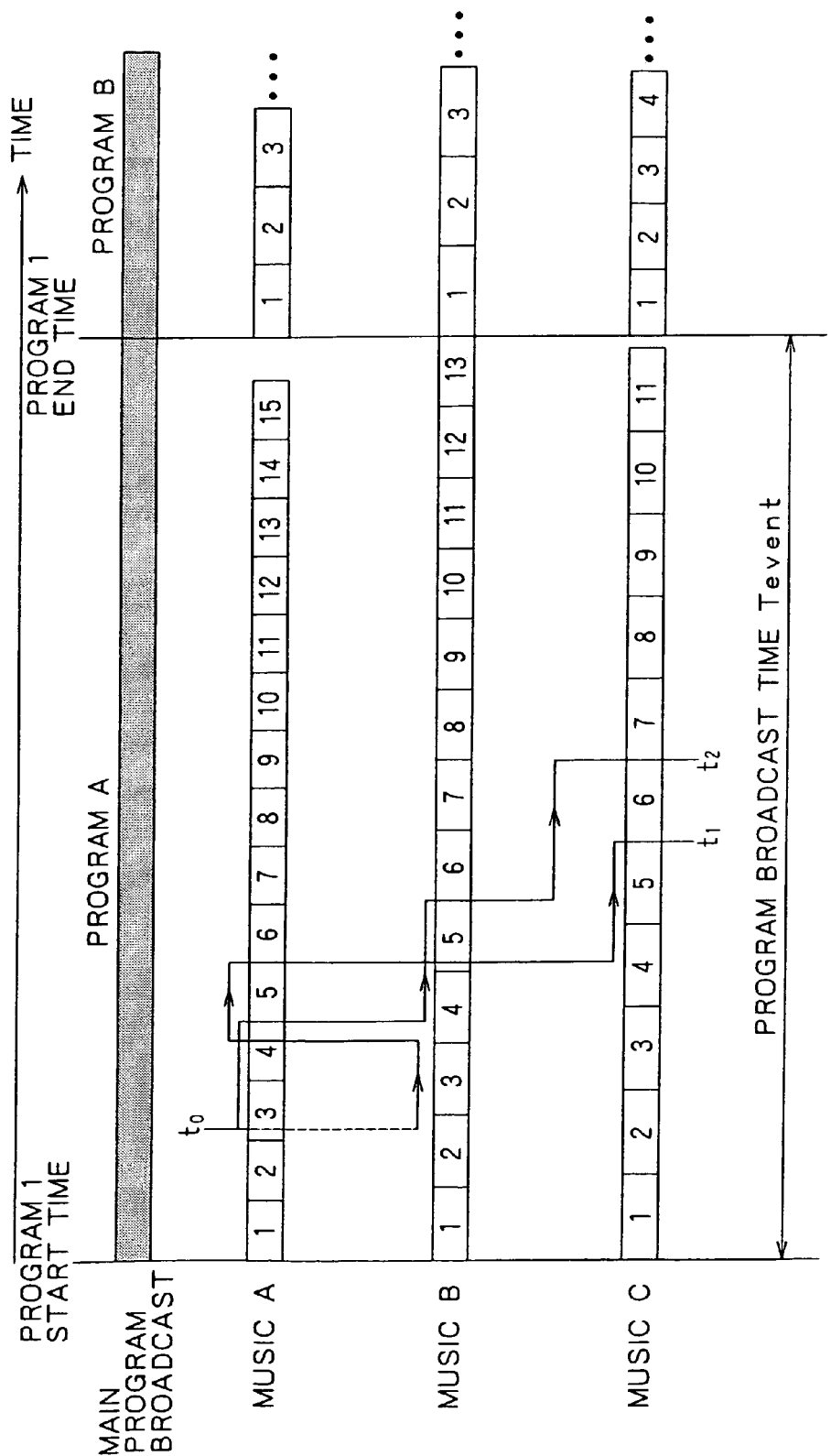
FIG. 15 illustrates the download sequence decision processing.

In step S22, the controller 39 references the audio additional information supplied from the descrambler 32 to optimize the sequence of downloading the plural pieces of music. For example, assume that music A, music B, and music C shown in FIG. 15 be purchased. Of these pieces of music data, the piece of music having the earliest transmission start timing (in this example, music B) at purchase specification time to is downloaded first. At the end of transmission of music B, the piece of music (in this example, music A) having the earlier transmission start timing of the remaining two pieces of music is downloaded next. The remaining piece of music (in this example, music C) is downloaded last. Thus, optimizing the download sequence results in download end time $t_1$. On the contrary, if the download sequence is not optimized and music A, music B, and music C are downloaded in this order, the download end time results in $t_2$, which is delayed behind $t_1$ by one piece of music.

It will be apparent that like download sequence optimization is applied to downloading of three or more pieces of music.

In step S23, the controller 39 determines whether there is any music data that cannot be downloaded because of the purchase limit time in the download sequence determined in step S22. If such music data are found, the processing goes to step S24.

In step S24, the controller 39 displays a message telling that there are music data that cannot be downloaded and their titles on the information display area 52 of the GUI. The user can know by this display that there are music data that cannot be downloaded and therefore, can reselect music data to be purchased.

It should be noted that, if no music data that cannot be downloaded are found in step S23, step S24 is skipped.

After execution of the download sequence determination processing, the processing goes back to step S17 shown in FIG. 13. In step S17, the descrambler 32, under the control of the controller 39, extracts the music data according to the sequence determined in step S16 and outputs the extracted music data to the following stage. It should be noted that, when downloading MPEG audio data, the downloaded MPEG audio data are decoded by the MPEG audio decoder 35 and the decoded MPEG audio data are recorded on the MD deck 10 for example through the audio controller 36 and the audio output terminal. When downloading ATRAC data, the downloaded ATRAC data are recorded on the MD deck 9 through the IEEE 1394 interface 37.

Thus, executing the purchase processing including the download sequence determination processing permits the efficient downloading of more pieces of music data.

It should be noted that, if the controller 39 detects the level of the received radio wave and the detected level is found below a certain value in step S11, it may be determined that there are no purchasable music data.

Also, the sequence in which plural pieces of music data are selected in step S14 may be stored to skip the download sequence determination processing of step S16, downloading the plural pieces of music data according to the stored sequence.

If music data are downloaded in a sequence not desired by the user, the MD decks 9 and 10 can reproduce the downloaded music data in any sequence as standard capabilities.

Figure 16:
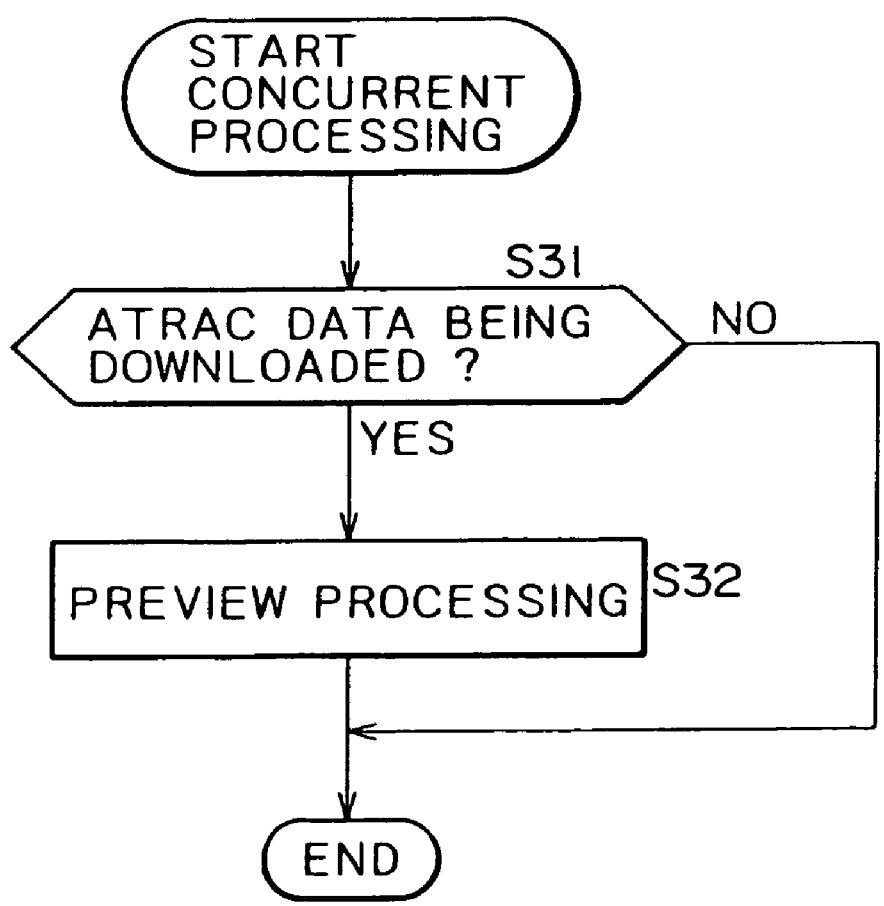
FIG. 16 is a flowchart for describing concurrent processing of IRD.

In the present embodiment, there exist two types of music data for downloading at the same time, MPEG audio data and ATRAC data, the MPEG audio data being reproduced at the time of preview. Therefore, when ATRAC data are being downloaded, MPEG audio data can be previewed concurrently. The following describes this concurrent processing with reference to the flowchart shown in FIG. 16.

The concurrent processing is executed at the same time the download processing of step S17 shown in FIG. 13 is executed. In step S31, the controller 39 determines whether the music data being downloaded are ATRAC data. If the music data being downloaded are found ATRAC data, the processing goes to step S32. In step S32, the controller 39 executes the preview processing described before (refer to FIG. 11). It is assumed, however, that the same music title as the ATRAC data being downloaded and an already downloaded music title cannot be previewed.

If, in step S31, the music data being downloaded are found not ATRAC data (that is, the music data being downloaded are MPEG audio data), step S32 is skipped.

The MPEG audio data of a music title different from the ATRAC data being downloaded may also be purchased in step S32.

Execution of this concurrent processing allows the user to preview a music while other than that being downloaded or download the music data of two different titles of the music (the ATRAC data of one music and the MPEG audio data of another music) at the same time.

Figure 17:
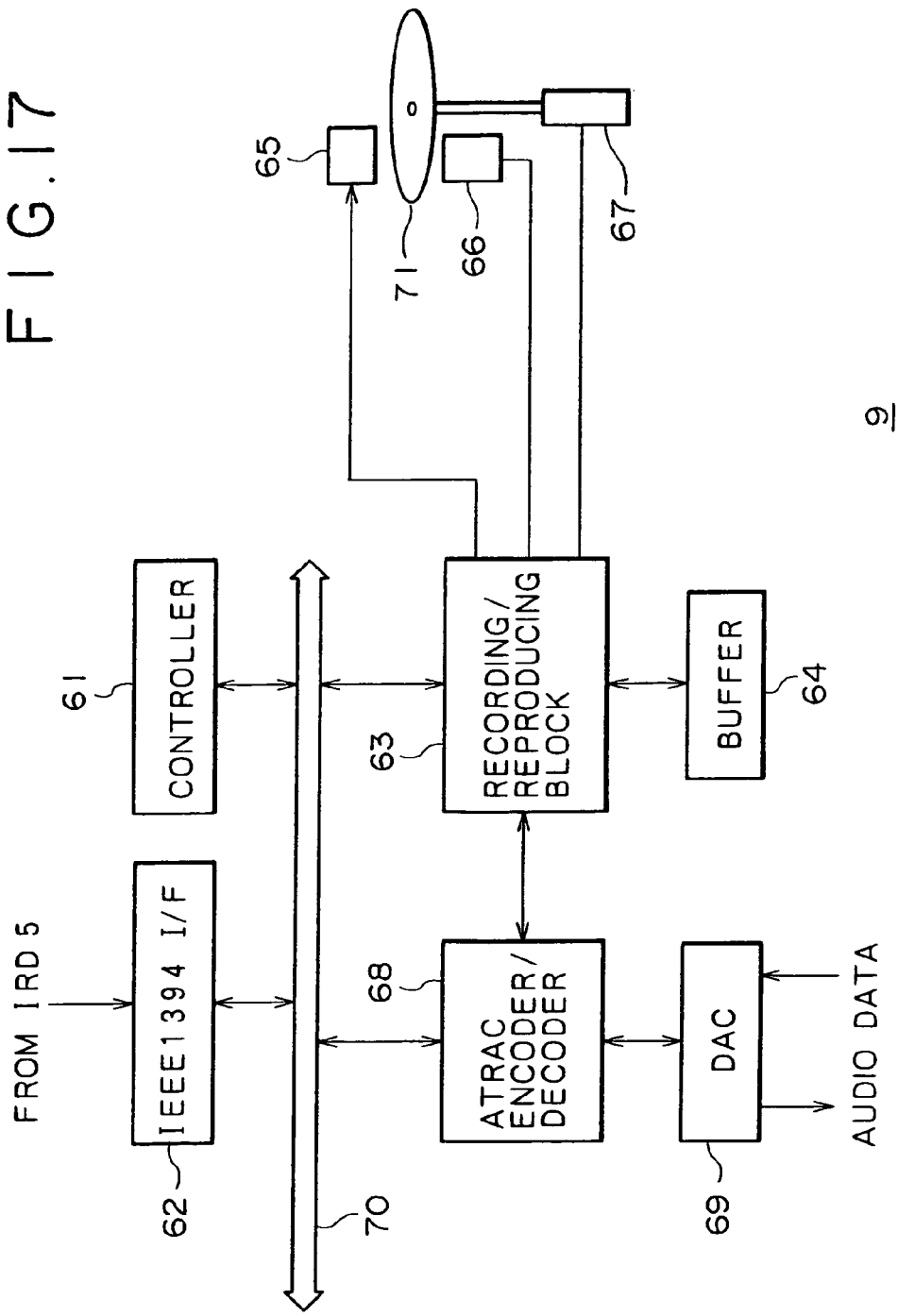
FIG. 17 is a block diagram illustrating an exemplary configuration of an MD recorder shown in FIG. 1.

The following describes an exemplary configuration of the MD deck 9 connected to the IRD 5 through the IEEE 1394 bus 8 with reference to FIG. 17. The MD deck 9 comprises a controller 61 for controlling the components of the MD deck 9, an IEEE 1394 interface 62 for receiving from the IRD 5 a partial TS in which ATRAC data are arranged, a recording/reproducing block 63 for controlling the recording and reproduction of the ATRAC data on an MD 71, and an ATRAC encoder/decoder 68 for decoding the ATRAC data supplied from the recording/reproducing block 63 and outputting the decoded ATRAC data to a DAC 69 or encoding digital audio data supplied from the DAC 69 and outputting the encoded data to the recording/reproducing block 63, these components being interconnected by a system bus 70.

The recording/reproducing block 63 is connected to a buffer 64 for temporarily storing the ATRAC data to be recorded on the MD 71, a magnetic head 65, an optical pickup 66, and a spindle motor 67. In a recording operation, the optical pickup 66 radiates a laser beam onto the MD 71 to raise the temperature at the radiation spot to a predetermined level. The magnetic head 65 records a magnetic signal corresponding to the ATRAC data supplied from the recording/reproducing block 63 onto the radiation spot on the MD 71 temperature at which has been raised to the predetermined level. In a reproducing operation, the optical pickup 66 radiates a laser beam onto the MD 71, receives the reflected beam, converts the received beam into an electrical signal, and outputs the resultant ATRAC data to the recording/reproducing block 63. The spindle motor 67, under the control by the recording/reproducing block 63, rotates the MD 71.

The ATRAC encoder/decoder 68 is connected to the DAC 69 which makes conversion between digital and analog signals.

The following describes operations of the MD deck 9. In a recording operation, on the basis of a PSI packet multiplexed with a partial TS supplied from the IRD 5, the IEEE 1394 interface 62 detects a PES packet in the ATRAC data are arranged and extracts only the ATRAC data from the PES packet. The extracted ATRAC data are supplied to the recording/reproducing block 63 through the system bus 70. The recording/reproducing block 63 controls the magnetic head 65, the optical pickup 66, and the spindle motor 67 to record the ATRAC data supplied from the IEEE 1394 interface 62 onto the MD 71.

In a reproducing operation, the recording/reproducing block 63 controls the optical pickup 66 and the spindle motor 67 to read the ATRAC data from the MD 71 and supplies the read ATRAC data to the ATRAC encoder/decoder 68. The ATRAC encoder/decoder 68 decodes the ATRAC data supplied from the recording/reproducing block 63 and outputs the decoded ATRAC data to a speaker for example through the DAC 69.

Figure 18:
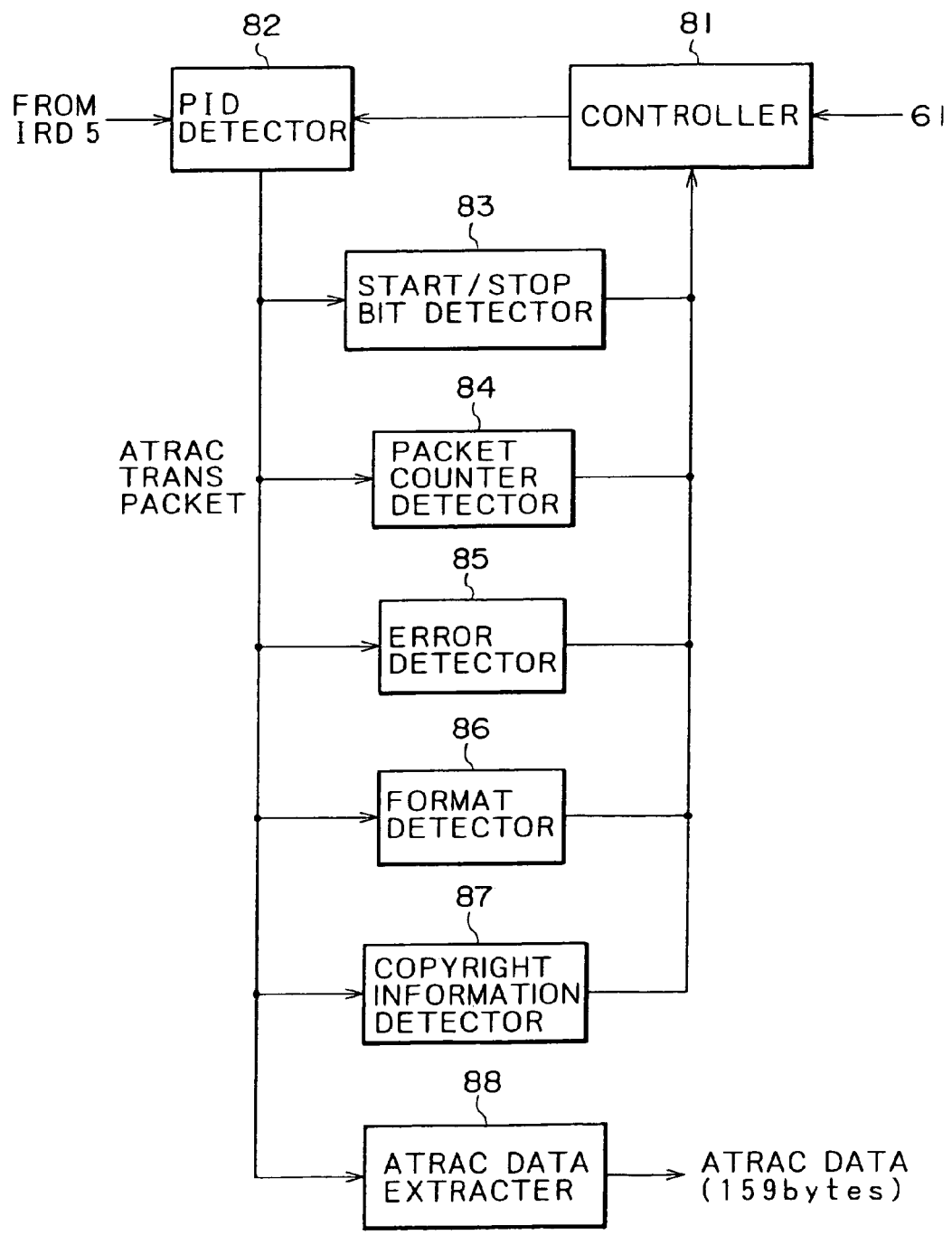
FIG. 18 is a block diagram illustrating an exemplary configuration of an IEEE 1394 interface shown in FIG. 17.

Referring to FIG. 18, there is shown a detail exemplary configuration of the IEEE 1394 interface 62. A controller 81 controls the processing of a PID detector 82 according to predetermined information supplied from the controller 61, a start/stop bit detector 83 through an ATRAC data extractor 88.

The PID detector 82 converts the partial TSs supplied from the IRD 5 into an MPEG stream, extracts only a TS packet of which 13-bit PID (refer to FIG. 13) described in the packet header is equal to a predetermined PID (indicative of the TS packet in which the ATRAC data are arranged) specified by the controller 81, and outputs the extracted TS packet to the preceding stage including start/stop bit detector 83 through ATRAC data extractor 88.

The start/stop bit detector 83 checks the data start indicator (23rd byte of the TS packet shown in FIG. 8) of each of the TS packets sequentially supplied from the PID detector 82. If "1" is written in the data start indicator, the information thereof is outputted to the controller 81. This detection information is supplied to the controller 61 through the controller 81 to provide a trigger for starting of recording the ATRAC data onto the MD 71. The start/stop bit detector 83 also checks the data end indicator (the bit adjacent the LSB side of the data start indicator). If "1" is written in the data end indicator, the information thereof is outputted to the controller 81. This detection information is supplied to the controller 61 through the controller 81 to provide a trigger for ending of recording the ATRAC data onto the MD 71.

A packet counter detector 84 verifies the continuity of the PES data counter (3 bits adjacent to the LSB side of the data end indicator) and the present PES number (bytes 24th through 26th of the TS packet shown in FIG. 8) of each TS packet sequentially supplied from the PID detector 82.

The PES data counter is a cyclic counter taking a value 0 to 7. The present PES number is incremented by 1 every time the PES data counter makes one cycle. Namely, 1 is written to the PES data counter of the first TS packet of the 8 TS packets constituting a PES packet of consecutive normal TS (having no dropped packet). A value incremented by 1 is sequentially written to the PES counter of each of the following TS packets, 7 being written to the PES data counter of the 8th TS packet. The present PES number is common to these 8 TS packets. Values 0 through 7 are written again to the PES data counters of the following 8 TS packets. The present PES number of these 8 TS packets is a value with 1 added to the present PES number of the preceding 8 TS packets. It should be noted that the present PES number of the start TS packet of the ATRAC data with the data start indicator written to 1 is 0.

Therefore, the packet counter detector 84 reads and stores the PES data count values of the inputted TS packets and the value of the present PES number. If the continuity of the PES data counter values and the present PES number of the TS packets inputted next is found lost, the information thereof is outputted to the controller 81.

An error detector 85 detects the TS error indicator at the second byte of each TS packet sequentially supplied from the PID detector 82 to determine whether 1 is written to the TS error indicator. It should be noted that 1 is written to the TS error indicator if error correction processing could not fully execute error correction in the front end block 31 of the IRD 5. Therefore, if 1 is written to the TS error indicator, it is possible that at least one error is included in that TS packet. If the TS error indicator is found written with 1, the error detector 85 outputs the information thereof to the controller 81. At the same time, the error detector 85 verifies the ATRAC data written on 30th byte and on by use of the ATRAC data checksum at 29th byte of each TS packet. If an error is detected, the error detector 85 outputs the information thereof to the controller 81.

A format detector 86 detects the data type (19th byte of the TS packet shown in FIG. 6), data transmission type (20th byte of the TS packet shown in FIG. 6), FDF field length (21st byte of the TS packet shown in FIG. 8), and audio data types 1 and 2 (21st and 22nd bytes of the TS packet shown in FIG. 8) of each TS packet sequentially supplied from the PID detector 82. The format detector 86 then determines whether the values described in the detected information are predetermined values indicative of a packet that contains ATRAC data. If any of the values is found other than predetermined one, the information thereof is outputted to the controller 81.

A copyright information detector 87 detects the copyright, original or copy, copyright mode, and EMI mode (22nd and 23rd bytes of the TS packet shown in FIG. 8) of each TS packet sequentially inputted from the PID detector 82. The copyright information detector 87 then determines whether the values written in the detected information are predetermined values indicating that the ATRAC data are copy-enabled. If any of these values is found other than predetermined one, the information thereof is outputted to the controller 81.

The ATRAC data extractor 88 extracts the ATRAC data from 30th through 188th bytes of the TS packet supplied from the PID detector 82 and outputs the extracted ATRAC data to the following stage.

Figure 19:
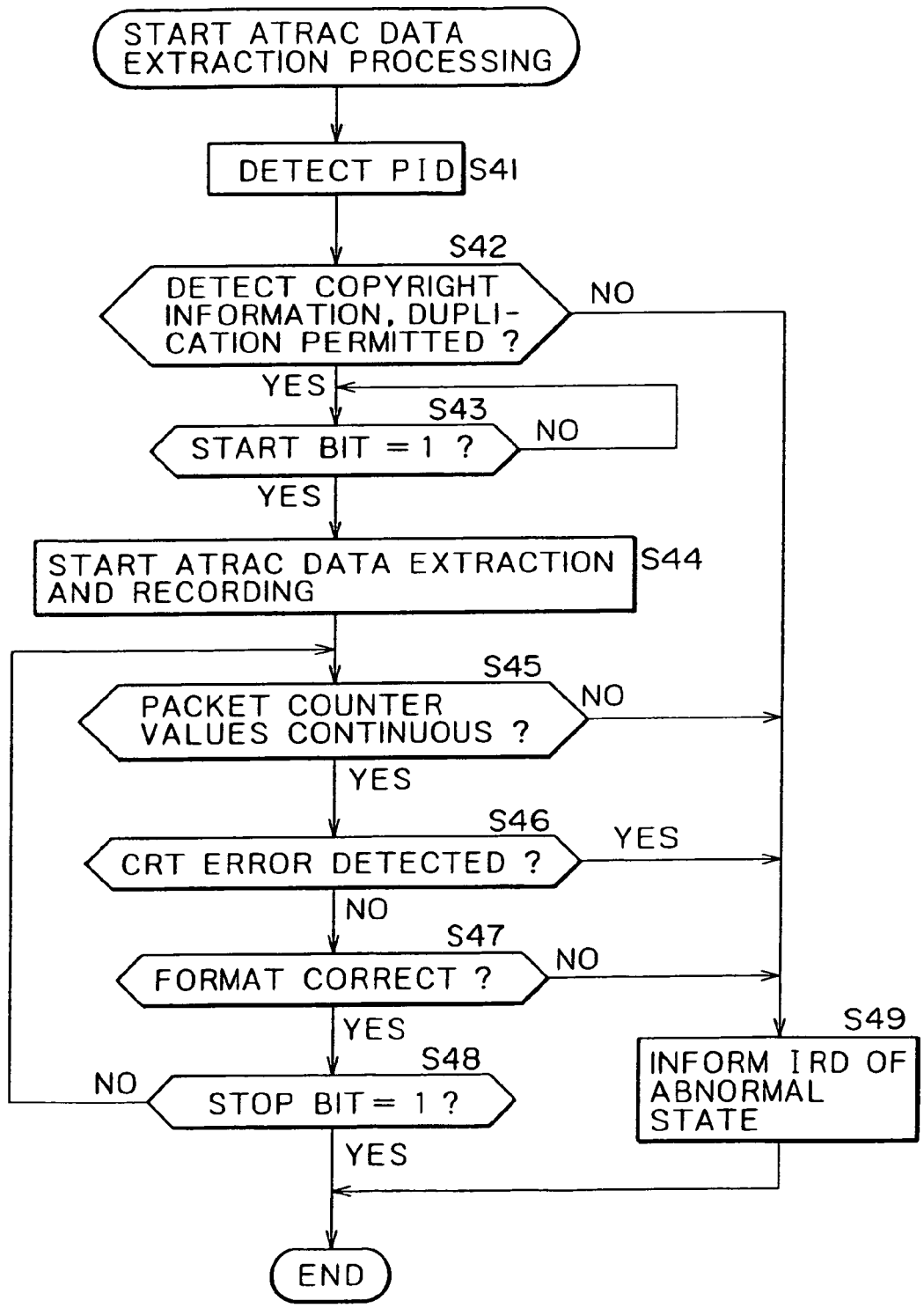
FIG. 19 is a flowchart for describing ATRAC data extraction processing of the IEEE 1394 interface.

The following describes the ATRAC data extraction processing of the IEEE 1394 interface 62 with reference to the flowchart of FIG. 19. This ATRAC data extraction processing starts when a partial TS is inputted from the IRD 5.

In step S41, the PID detector 82 converts the partial TS supplied from the IRD 5 into an MPEG stream, extracts only the TS packet equal to the PID indicative of the TS packet in which ATRAC data are arranged, and outputs the extracted TS packet to the following stage, the start/stop bit detector 83 through the ATRAC data extractor 88.

In step S42, the copyright information detector 87 detects the copyright, original or copy, copyright mode, and EMI mode of the TS packet supplied from the PID detector 82. The copyright information detector 87 then determines whether the values written in the detected information are predetermined values indicating that the ATRAC data are copy-enabled. If these values are found the predetermined values and the ATRAC data are found copy-enabled, the processing goes to step S43.

In step S43, the start/stop bit detector 83 monitors the data start indicator of the TS packet inputted from the PID detector 82 and waits until "1" is detected in the data start indicator. When "1" is detected, the information thereof is outputted to the controller 81. According to this detection information, the controller 81 outputs a predetermined signal to the ATRAC data extractor 88 and the controller 61.

In step S44, according to the signal supplied from the controller 81, the ATRAC data extractor 88 extracts the ATRAC data stored in 30th byte and on of the TS packet inputted from the PID detector 82 and outputs the extracted ATRAC data to the following stage, the recording/reproducing block 63. According to the signal supplied from the controller 81, the controller 61 directs each component of the MD deck 9 for starting the recording of the ATRAC data onto the MD 71.

In step S45, the packet counter detector 84 detects the PES data counter and present PES number of the TS packet supplied from the PID detector 82 to check the continuity of the values written in the PES data counter and the present PES number. If the PES data counter value and the present PES number are each found continuous, the processing goes to step S46.

In step S46, the error detector 85 detects the TS error indicator of the TS packet inputted from the PID detector 82 to determine whether "1" is written to the detected TS error indicator. In addition, the error detector 85 determines whether the ATRAC data written in 30th byte and on have an error by use of the ATRAC data checksum of the TS packet. If "1" is not found in the TS error indicator and the ATRAC data are found having no error, the processing goes to step S47.

In step S47, the format detector 86 detects the data type, data transmission type, FDF field length, and audio data types 1 and 2 of the TS packet supplied from the PID detector 82 and determine whether the values written in the detected information are predetermined values indicative of a packet that contains ATRAC data. If the values written in the detected information are found the predetermined values, the processing goes to step S48.

In step S48, the start/stop bit detector 83 monitors the data stop indicator of the TS packet inputted from the PID detector 82 to determine whether "1" is written to the data stop indicator. If "1" is not found, the processing goes back to step S45 to repeat the processing operations of step S45 and on. If "1" is found written to the data stop indicator, the start/stop bit detector 83 outputs the information thereof to the controller 81. According to this detection information, the controller 81 outputs a predetermined signal to the ATRAC data extractor 88 and the controller 61. According to the signal supplied from the controller 81, the ATRAC data extractor 88 ends the extraction of the ATRAC data from the TS packet inputted from the PID detector 82. According to the signal supplied from the controller 81, the controller 61 directs each component of the MD deck 9 for ending the recording of the ATRAC data onto the MD 71. Thus, the recording of the ATRAC data onto the MD 71 ends.

If, in step S42, the values recorded in the copyright, original or copy, copyright mode, and EMI mode of the TS packet inputted from the PID detector 82 are not the predetermined values and indicate that the ATRAC data arranged in that TS packet are not copy-enabled, this decision is outputted from the copyright information detector 87 to the controller 81, then the processing goes to step S49.

If, in step S45, the values written to the PES data counter and present PES number of the TS packet inputted from the PID detector 82 are found not continuous, the information thereof is outputted from the packet counter detector 84 to the controller 81, then the processing goes to step S49.

If, in step S46, "1" is written to the TS error indicator of the TS packet inputted from the PID detector 82 or if the ATRAC data are found having an error, the information thereof is outputted from the error detector 85 to the controller 81, then the processing goes to step S49.

If, in step S47, the values written to the data type, data transmission type, FDF field length, and audio types 1 and 2 of the TS packet inputted from the PID detector 82 are found not the predetermined values indicating that this packet contains ATRAC data, the processing goes to step S49.

In step S49, according to the decisions made by the packet counter detector 84 through the copyright information detector 87, the controller 81 makes the PID detector 82 stop extracting TS packets and outputs the information thereof to the controller 61. According to this information, the controller 61 directs each component of the MD deck 9 for stopping the recording of the ATRAC data onto the MD 71 and outputs the information thereof to the IRD 5.

It should be noted that the processing operations of steps S45 through S47 may be changed in sequence or may be executed concurrently.

If the error rate of the TS on the transmission path is low (that is, if the quality of the transmission path is high), the error detection by use of checksum in step S46 may not be executed, only executing the verification of the TS error indicator.

Thus, in the IEEE 1394 interface 62 of the MD 9, only the ATRAC data arranged in the TS packet are extracted. In this extraction, the TS packet is monitored for abnormal states (such as data drop and error). If any of the abnormal conditions is detected, the extraction of ATRAC data is stopped, thereby preventing the failure of downloading such as recording abnormal ATRAC data.

In the EMD system of the present embodiment, the present invention is applied to digital satellite broadcasting.

It will be apparent that this invention is also applicable to digital cable television and digital terrestrial broadcasting.

It will be also apparent that the present invention is applicable to not only audio data distribution services but also services for distributing computer programs for computers and television game machines.

Figure 20A:
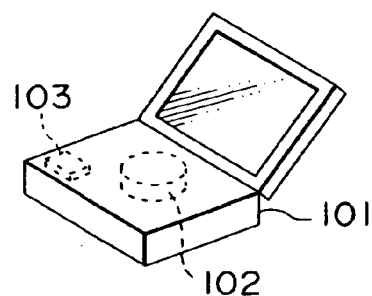
FIGS. 20A, 20B, and 20C illustrate various recording media.
Figure 20B:
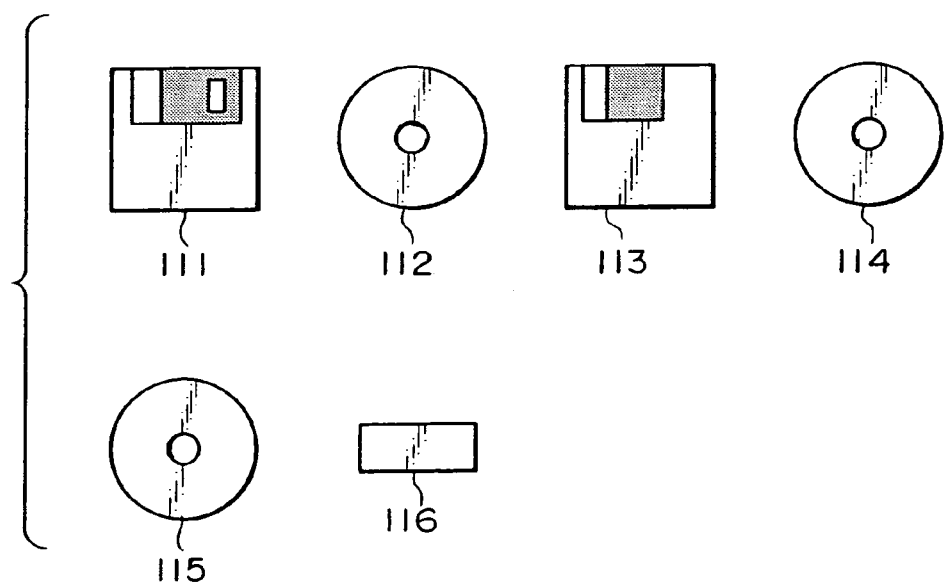
Figure 20C:
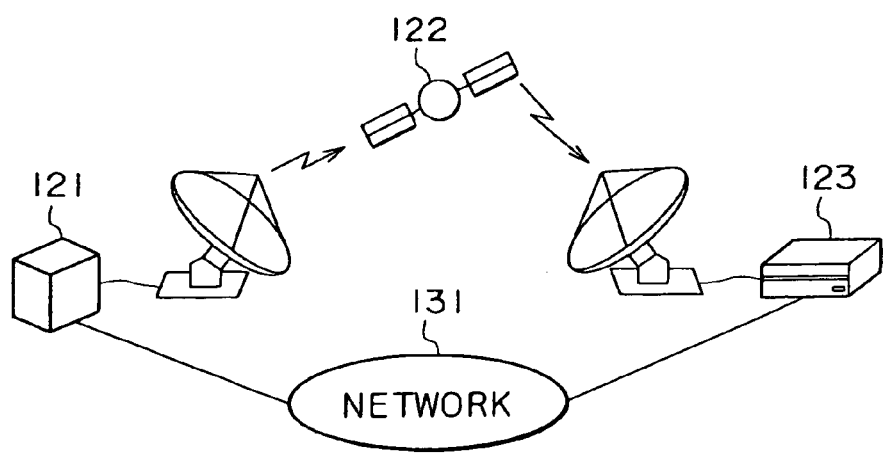

The following describes recording media with reference to FIGS. 20A, 20B, and 20C for use in installing the computer program for executing the above-mentioned series of processing operations onto the IRD or MD deck and makes the computer program ready for execution by the IRD or the MD deck.

The program for the IRD may be provided for users in a state in which the program is previously installed in a hard disk 102 or a semiconductor memory 103 as a recording medium built in an IRD 101 (equivalent to the IRD 5 shown in FIG. 1) as shown in FIG. 20A.

The program may be temporarily or permanently stored in a floppy disc 111, a CD-ROM (Compact Disc Read Only Memory) 112, an MO (Magneto-Optical) disc 113, a DVD (Digital Versatile Disc) 114, a magnetic disc 115, or a semiconductor memory 116 for distribution as package software.

In addition, the program may be transferred from a download site 121 to an IRD 123 through a communications satellite 122 on a wireless manner or through a local area network or the Internet in a wired or wireless manner to be stored on a hard disc for example built in the IRD 123.

The program for the MD deck is handled in the same manner as the program for the IRD and therefore the description of the MD deck program will be skipped.

It should be noted that the term "medium" used herein includes all of the above-mentioned recording media.

It should also be noted that the step for describing the programs provided in the recording media include not only the processing operations to be executed in the described sequence in a time-dependent manner but also the processing operations to be executed concurrently or individually.

It should be noted that the term "system" used herein denotes an entire apparatus composed of a plurality of units.

As described and according to a recording apparatus as recited in claim 1 appended hereto, a recording method as recited in claim 4 appended hereto, and a program as recited in claim 5 appended hereto, a transport stream packet having a predetermined PID is extracted from a transport stream. Encoded audio data are obtained from the extracted transport stream packet. Consequently, the audio data encoded by ATRAC scheme can be recorded without decoding the audio data.

While the preferred embodiments of the present invention have been described using specific terms, such description is for illustrative purposes only, and it is to be understood that changes and variations may be made without departing from the spirit or scope of the appended claims.

What is claimed is:

1. A recording apparatus for recording digital data compressively encoded by use of a predetermined scheme comprising:
   receiving means for receiving a transport stream from an external unit connected through a digital bus;
   extracting means for extracting from the received transport stream a transport stream packet having a predetermined packet identification (PID);
   acquiring means for acquiring said compressively encoded digital data arranged in said transport stream packet extracted by said extracting means; and recording means for recording the acquired digital data onto a predetermined recording medium;

whereby said transport stream further includes second compressively encoded digital data formed by compressively encoding said digital data according to a second predetermined scheme;

whereby said transport stream is a Motion Picture Experts Group (MPEG) type transport stream, said first predetermined scheme is a non-MPEG scheme, and said second predetermined scheme is an MPEG scheme; and whereby data encoded according to said first predetermined scheme includes audio data and data encoded according to said second predetermined scheme includes said audio data, said audio data being transmitted a multiple of times in both said data encoded according to said first predetermined scheme and data encoded according to said second predetermined scheme, and the number of multiple times of said audio data according to said first predetermined scheme is greater than the number of multiple of times of said data encoded according to said second predetermined scheme.

2. The recording apparatus according to claim 1, further comprising:

converting means for receiving a partial transport stream from said external unit and converting said partial transport stream into a transport stream.

3. The recording apparatus according to claim 1, further comprising:

decision means for detecting predetermined information arranged in said transport stream packet extracted by said extracting means and, on the basis of the detected predetermined information, determining whether recording of said transport stream packet is enabled.

4. The recording apparatus according to claim 3, further comprising:

control means for controlling extraction processing of said extracting means according to a decision result of said decision means.

5. The recording apparatus according to claim 4, further comprising:

if the extraction processing of said transport stream packet is stopped in said extracting means according to the decision result of said decision means, notification means for notifying said external unit connected through said digital bus of the stop of recording.

6. The recording apparatus according to claim 1, further comprising:

reproducing means for reproducing audio data recorded on said predetermined recording medium and compressively encoded by use of said predetermined scheme.

7. The recording apparatus according to claim 1, wherein said predetermined scheme is adaptive transform acoustic coding (ATRAC) and said recording medium is a Mini Disc (MD).

8. A digital broadcast receiving apparatus for receiving a digital broadcast signal comprising:

selecting means for selecting a desired transmission channel from the received digital broadcast signal;

demodulating means for demodulating a transport stream transmitted by the selected transmission channel;

extracting means for extracting a transport stream, which is data to be downloaded, from the demodulated transport stream and supplying the extracted transport stream to a recording unit through a digital bus; and if the recording of said transport stream is stopped in said recording unit, receiving means for receiving notification thereof;

whereby said transport stream includes first compressively encoded digital data formed by compressively encoding digital data according to a first predetermined scheme and second compressively encoded digital data formed by compressively encoding said digital data according to a second predetermined scheme;

whereby said transport stream is a Motion Picture Experts Group (MPEG) type transport stream, said first predetermined scheme is a non-MPEG scheme, and said second predetermined scheme is an MPEG scheme; and whereby data encoded according to said first predetermined scheme includes audio data and data encoded according to said second predetermined scheme includes said audio data, said audio data being transmitted a multiple of times in both said data encoded according to said first predetermined scheme and data encoded according to said second predetermined scheme, and the number of multiple times of said audio data according to said first predetermined scheme is greater than the number of multiple of times of said data encoded according to said second predetermined scheme.

9. The digital broadcast receiving apparatus according to claim 8, further comprising:

display processing circuit for displaying the stop of recording when said receiving means has received said notification.

10. A recording method for a recording apparatus for recording digital data compressively encoded by use of a predetermined scheme, comprising the steps of:

receiving a transport stream from an external unit connected through a digital bus;

extracting from the received transport stream a transport stream packet having a predetermined packet identification (PID);

acquiring said compressively encoded digital data arranged in said transport stream packet extracted by said extracting means; and recording the acquired digital data onto a predetermined recording medium;

whereby said transport stream further includes second compressively encoded digital data formed by compressively encoding said digital data according to a second predetermined scheme;

whereby said transport stream is a Motion Picture Experts Group (MPEG) type transport stream, said first predetermined scheme is a non-MPEG scheme, and said second predetermined scheme is an MPEG scheme; and whereby data encoded according to said first predetermined scheme includes audio data and data encoded according to said second predetermined scheme includes said audio data, of said audio data being transmitted a multiple of times in both said data encoded according to said first predetermined scheme and data encoded according to said second predetermined scheme, and the number of multiple times of said audio data according to said first predetermined scheme is greater than the number of multiple of times of said data encoded according to said second predetermined scheme.

11. The recording method according to claim 10, further comprising the step of:

receiving a partial transport stream from said external unit and converting said partial transport stream into a transport stream.

12. The recording method according to claim 10, further comprising the step of:

detecting predetermined information arranged in said transport stream packet extracted in said extracting step and, on the basis of the detected predetermined information, determining whether recording of said transport stream packet is enabled.

13. The recording method according to claim 12, further comprising the step of:

controlling extraction processing of said extracting means according to a decision result of said decision step.

14. The recording method according to claim 13, further comprising the step of:

if the extraction processing of said transport stream packet is stopped in said extracting step according to the decision result of said decision step, notifying said external unit connected through said digital bus of the stop of recording.

15. The recording method according to claim 10, further comprising the step of:

reproducing audio data recorded on said predetermined recording medium and compressively encoded by use of said predetermined scheme.

16. The recording method according to claim 10, wherein said predetermined scheme is adaptive transform acoustic coding (ATRAC) and said recording medium is a Mini Disc (MD).

17. A computer readable recording medium storing a computer program for use in a recording method for a recording apparatus for recording digital data compressively encoded by use of a predetermined scheme, said computer program comprising the steps of:

receiving a transport stream from an external unit connected through a digital bus;

extracting from the received transport stream a transport stream packet having a predetermined packet identification (PD);

acquiring said compressively encoded digital data arranged in said transport stream packet extracted by said extracting means; and recording the acquired digital data onto a predetermined recording medium;

whereby said transport stream further includes second compressively encoded digital data formed by compressively encoding said digital data according to a second predetermined scheme;

whereby said transport stream is a Motion Picture Experts Group (MPEG) type transport stream, said first predetermined scheme is a non-MPEG scheme, and said second predetermined scheme is an MPEG scheme; and whereby data encoded according to said first predetermined scheme includes audio data and data encoded according to said second predetermined scheme includes said audio data, said audio data being transmitted a multiple of times in both said data encoded according to said first predetermined scheme and data encoded according to said second predetermined scheme, and the number of multiple times of said audio data according to said first predetermined scheme is greater than the number of multiple times of said data encoded according to said second predetermined scheme.

18. The recording medium according to claim 17, said computer program further comprising the step of:

receiving a partial transport stream from said external unit and converting said partial transport stream into a transport stream.

19. The recording medium according to claim 17, said computer program further comprising the step of:

detecting predetermined information arranged in said transport stream packet extracted in said extracting step and, on the basis of the detected predetermined information, determining whether recording of said transport stream packet is enabled.

20. The recording medium according to claim 19, said computer program further comprising the step of:

controlling extraction processing of said extracting means according to a decision result of said decision step.

* * * * *